United States Patent [19]
Yamakita

[11] Patent Number: 5,956,681
[45] Date of Patent: Sep. 21, 1999

[54] APPARATUS FOR GENERATING TEXT DATA ON THE BASIS OF SPEECH DATA INPUT FROM TERMINAL

[75] Inventor: Tooru Yamakita, Fussa, Japan

[73] Assignee: Casio Computer Co., Ltd., Tokyo, Japan

[21] Appl. No.: 08/966,912

[22] Filed: Nov. 6, 1997

[30] Foreign Application Priority Data

Dec. 27, 1996 [JP] Japan .................................. 8-350323

[51] Int. Cl.⁶ ...................................................... G01L 9/06
[52] U.S. Cl. ...................... 704/260; 704/235; 704/231; 704/270
[58] Field of Search .................................. 704/231, 270, 704/275, 260, 235; 379/93.09, 67, 88; 706/20; 707/523; 395/601

[56] References Cited

U.S. PATENT DOCUMENTS

| | | | |
|---|---|---|---|
| 4,712,243 | 12/1987 | Ninomiya et al. | |
| 5,128,985 | 7/1992 | Yoshida et al. | 379/93.09 |
| 5,163,111 | 11/1992 | Baji et al. | 706/20 |
| 5,182,765 | 1/1993 | Ishii et al. | 379/88 |
| 5,280,520 | 1/1994 | Abe | 379/100.14 |
| 5,465,326 | 11/1995 | Sawada | 707/523 |
| 5,577,165 | 11/1996 | Takebayashi et al. | 704/275 |
| 5,625,675 | 4/1997 | Katsumaru et al. | 379/67 |
| 5,632,002 | 5/1997 | Hashimoto et al. | 704/231 |
| 5,758,332 | 5/1998 | Hirotani | 395/601 |

FOREIGN PATENT DOCUMENTS 0 405 029 A1  1/1991  European Pat. Off. .

OTHER PUBLICATIONS

Furui, "Introduction to Electronics/Information Engineering 2, Acoustic/Phonetic Engineering", Chapter 14, Kindaikagaku–sha, pp. 175–211.

Patent Abstracts Of Japan, vol. 009, No. 173 (E–329), Jul. 18, 1995 & JP 60 046647 A (Fujitsu KK), Mar. 13, 1985.

Patent Abstracts of Japan, vol. 095, No. 011, Dec. 26, 1995 & JP 07 222248 (Hitachi Ltd.), Aug. 18, 1995.

*Primary Examiner*—David R. Hudspeth
*Assistant Examiner*—Vijay B. Chawan
*Attorney, Agent, or Firm*—Frishauf, Holtz, Goodman, Langer & Chick, P.C.

[57] ABSTRACT

A speech signal input from the microphone of a mobile terminal having a PHS function in a communication or off-line state is sent from a PHS network to a speech control host unit connected to a LAN in a specific speech service provider through the Internet and recognized. The contents of the recognition result are automatically determined and shaped into text data of a format type designated from the mobile terminal, and more particularly, into E-mail text data or FAX text data. The formatted text data is returned to the mobile terminal in real time and edited on the mobile terminal as needed. Thereafter, the E-mail text data or FAX text data is transferred to the speech control host unit and transmitted. In this system, the mobile terminal does not require any advanced speech recognition environment and can have a speech recognition function having a practical accuracy at a low cost. The mobile terminal can also be equipped with an E-mail/FAX generation/transmission function based on the speech recognition result.

12 Claims, 18 Drawing Sheets

| | | | | |
|---|---|---|---|---|
| FIRST WORD | VERSION | HEADER LENGTH | SERVICE TYPE | TOTAL IP DATAGRAM LENGTH |
| SECOND WORD | IDENTIFICATION NUMBER | | FLAG STRING | FRAGMENT OFFSET |
| THIRD WORD | TIME OF LIVE | PROTOCOL | HEADER CHECKSUM | |
| FOURTH WORD | TRANSMISSION SOURCE IP ADDRESS | | | |
| FIFTH WORD | DESTINATION IP ADDRESS | | | |
| SIXTH WORD | IP OPTION | | | PADDING |

FIG.7A

| | | | | |
|---|---|---|---|---|
| FIRST WORD | TRANSMISSION SOURCE PORT NUMBER | | DESTINATION PORT NUMBER | |
| SECOND WORD | SEQUENCE NUMBER | | | |
| THIRD WORD | CONFIRMATION RESPONSE NUMBER | | | |
| FOURTH WORD | HEADER LENGTH | RESERVED | FLAG STRING | WINDOW |
| FIFTH WORD | CHECKSUM | | EMERGENCY POINTER | |
| SIXTH WORD | OPTION | | | PADDING |

FIG.7B

| TERMINAL IDENTIFICATION CODE | TRANSMISSION SOURCE IP ADDRESS | FORMAT TYPE | FINAL ACCESS TIME | SPEECH BUFFER FILE NAME | TEXT BUFFER FILE NAME | FORMATTED TEXT BUFFER FILE NAME |
|---|---|---|---|---|---|---|
| | | | | | | |
| | | | | | | |
| ... | ... | ... | ... | ... | ... | ... |

FIG.10

APPARATUS FOR GENERATING TEXT DATA ON THE BASIS OF SPEECH DATA INPUT FROM TERMINAL

BACKGROUND OF THE INVENTION

The present invention relates to a technique of recognizing speech data such as communication speech data input from a mobile (portable) terminal and generating an E-mail document or a FAX document, i.e., text data formatted on the basis of the recognition result and, more particularly, to a technique of transmitting the generated document.

A speech recognition technique of recognizing a speech signal, converting the speech signal into character data, and storing the character data or using the recognition result for various services is conventionally demanded in various industrial fields.

In recent years, along with the advance of the speech recognition algorithm, speech recognition systems using main frame computers or workstation computers have been developed.

These systems, such as by a bank balance inquiry system for receiving telephone speech data, a seat reservation system, and a goods sorting system for automatically delivering goods upon recognizing the operator voice, are being introduced to various industrial fields.

However, such speech recognition systems have just reached a practical recognition accuracy in the environment of the above-described large-scale computer system. In the environment of a small computer system such as a personal computer, no inexpensive speech recognition systems having a practical recognition accuracy has been realized yet.

Together with the above-described information processing technology, mobile terminals including such as mobile phones, portable telephones, and PHSs (Personal Handyphone Systems) are rapidly becoming popular.

In particular, the PHS is compact and more inexpensive with respect to telephone charges than a mobile phone or portable telephone, and it is explosively being popularized because of its characteristic feature, i.e., the capability of high-quality communication "with anybody anytime anywhere". In addition, the PHS uses a public network having an ISDN (Integrated Services Digital Network) as a backbone and therefore allows high-speed digital communication at a transfer rate of 32 kbits/sec, so that future applications to multimedia communication fields are also increasingly expected.

The PHS is also expected as a multimedia information management/communication terminal which can be used not only as a portable telephone but also as a portable information management device while exploiting the convenience of the mobile terminal. More specifically, such a mobile terminal is expected to have a home page access function and an E-mail communication function as functions of accessing the Internet or an intra-office network as well as a speech communication/FAX function. An information management function such as address management, schedule management, memo management, or database searching is also expected to be arranged.

Such a mobile terminal is required to have a user interface as user-friendly and natural as possible such that the user can readily use it. User interfaces currently put into practice include finger operation input from a keyboard or a mouse and handwriting input using an electronic pen. It is ideal that the user interface can also cope with speech input or the like. More specifically, when not only address input, schedule input, and memo input but also E-mail generation/transmission and FAX generation/transmission are enabled using a speech signal representing the speech contents as data while using the speech communication function as the basic function, the convenience of the mobile terminal can be largely increased. This is the advantage of the application of the speech recognition function as a user interface to the mobile terminal.

However, the mobile terminal is compact and has only a limited information processing capability. In addition, in current speech recognition processing, the practical recognition accuracy can be realized only in the environment of a main frame computer or workstation computer. Therefore, the speech recognition function as the user interface of a mobile terminal has not yet been realized.

BRIEF SUMMARY OF THE INVENTION

It is an object of the present invention to realize, in a communication environment using a mobile terminal, a speech recognition function as a user interface of the mobile terminal at a practical accuracy and cost and to enable generation/transmission of an E-mail or FAX document as formatted text data on the basis of the recognition result.

To achieve the above object, there is provided a speech control apparatus connected to a terminal through a communication network, comprising: means for receiving speech data transmitted from the terminal; means for recognizing the received speech data and converting the speech data into document data; means for extracting a word from the converted document data and generating formatted text data on the basis of the extracted word; and means for transmitting the generated formatted text data through the communication network.

According to the present invention, since speech recognition processing need not be performed on the terminal side, simplification of processing and size reduction of the terminal can be realized. Only by inputting speech data from the terminal, another text format data such as E-mail data or FAX data can be obtained. Therefore, the interface is easy to use as compared to the conventional text data input in a key operation. In addition, an E-mail or FAX function can be added even when the terminal side has no special function.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 7A and 7B are views showing the formats of an IP header and a TCP header, respectively;

FIG. 10 is a view showing the data structure of a processing terminal registration table;

DETAILED DESCRIPTION OF THE INVENTION

An embodiment of the present invention will be described below in detail with reference to the accompanying drawing.

System Configuration

Figure 1:
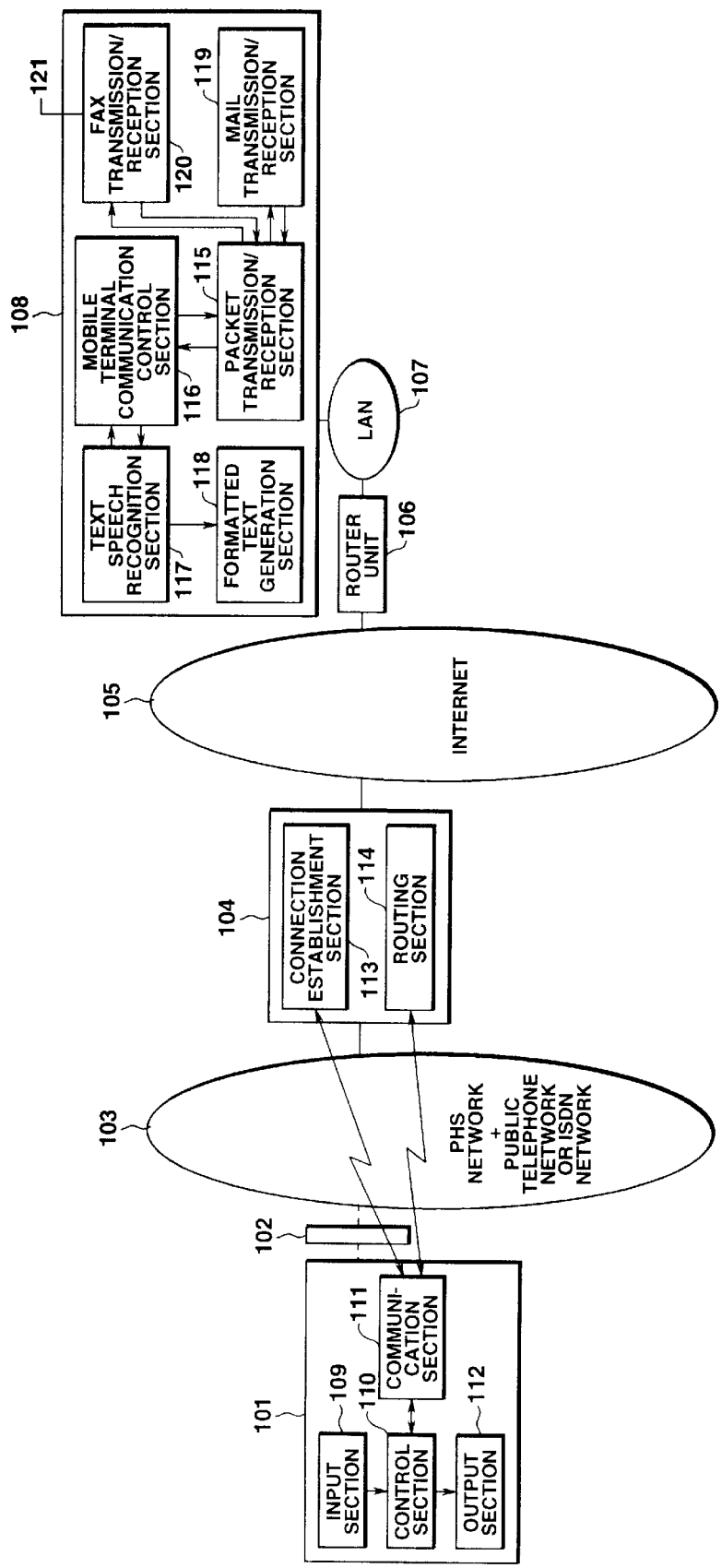
FIG. 1 is a block diagram showing the entire system configuration.

FIG. 1 is a block diagram showing the entire system configuration of the embodiment of the present invention.

A mobile terminal 101 has a PHS terminal function and is connected to a PHS network 103 via a radio base station 102 in radio communication. The radio base station 102 is a public radio base station provided on a public telephone booth on a street, a utility pole, a building rooftop, or an underpass, or an extension telephone in a subscriber's house. When the mobile terminal 101 is connected to the extension telephone, it is directly connected to the public telephone network without interposing the PHS network. The mobile terminal 101 may be connected to the PHS network 103 or the public telephone network in wire communication via a wire connection unit in place of the radio base station 102.

The PHS network 103 is mutually connected to the public telephone network or an ISDN network, and these networks are connected to a mobile terminal control host unit 104 connected to the Internet 105 through a dedicated high-speed digital line or the like.

When the mobile terminal 101 automatically originates a dial-up call, through the radio base station 102 or the PHS network 103, to the mobile terminal control host unit 104 connected to the public telephone network or ISDN network, the mobile terminal 101 can be connected to the Internet 105.

A router unit 106 connected to a LAN 107 of a predetermined speech service provider through a high-speed digital leased line or the like is connected to the Internet 105. The LAN 107 is a local area network based on Ethernet, ATM (Asynchronous Transfer Mode), or FDDI. A speech control host unit 108 is also connected to the LAN 107.

After the mobile terminal 101 automatically originates a dial-up call to the mobile terminal control host unit 104, the mobile terminal 101 can communicate with the speech control host unit 108 through the Internet 105, the router unit 106, and the LAN 107.

When the user instructs communication with the speech control host unit 108 from the touch panel of an input section 109 in the mobile terminal 101, a control section 110 requests a communication section 111 to start communication with the speech control host unit 108.

If the mobile terminal 101 is not currently connected to the mobile terminal control host unit 104, the communication section 111 originates a call to the radio base station 102 by radio (or by wire) to connect the mobile terminal 101 to the PHS network 103 upon receiving the request for starting the communication from the control section 110, and thereafter, designates the access telephone number of the mobile terminal control host unit 104 and originates a dial-up call.

When the call terminates at the mobile terminal control host unit 104, the communication section 111 in the mobile terminal 101 communicates with a connection establishment section 113 in the mobile terminal control host unit 104 first to negotiate for establishment of connection based on TCP/IP and PPP as a standard communication protocol on the Internet 105. As a result, the mobile terminal control host unit 104 assigns an IP address as an identification address on the Internet 105 to the communication section 111 in the mobile terminal 101, thereby allowing the mobile terminal 101 to access the Internet 105.

If the mobile terminal 101 is connected to the mobile terminal control host unit 104, the communication section 111 in the mobile terminal 101 omits the dial-up call origination.

The communication section 111 in the mobile terminal 101 sends a TCP/IP packet which stores a "destination IP address" serving as a predetermined IP address of the speech control host unit 108, a "transmission source IP address" serving as the IP address assigned by the mobile terminal control host unit 104, a "terminal identification code" (e.g., a PHS telephone number) for identifying the mobile terminal 101, and a text speech recognition/formatting start request command and a format type data based on an instruction from the user or a text speech recognition/formatting end command to the Internet 105.

This TCP/IP packet is transferred to the router unit 106 in the speech service provider by a routing section 114 in the mobile terminal control host unit 104 and a relay host unit (not shown) in the Internet 105 on the basis of the "destination IP address" stored in the TCP/IP packet, and then transferred to a packet transmission/reception section 115 in the speech control host unit 108 through the LAN 107.

The packet transmission/reception section 115 extracts, from the received TCP/IP packet, the "transmission source IP address", the "terminal identification code", and the text speech recognition/formatting start request command and the format type data, or the text speech recognition/formatting end request command, and transfers these data to a mobile terminal communication control section 116 in the speech control host unit 108.

The mobile terminal communication control section 116 registers, in a processing terminal registration table (FIG. 10) to be described later, information associated with the transferred "transmission source IP address", "terminal identification code", and text speech recognition/formatting start request command and format type data, or text speech recognition/formatting end request command. Thereafter, the mobile terminal communication control section 116 requests the packet transmission/reception section 115 to return a TCP/IP packet storing transmission enable data to the mobile terminal 101.

The packet transmission/reception section 115 transmits the corresponding TCP/IP packet to the IP address corresponding to the mobile terminal 101.

In this way, the speech control host unit 108 can execute text speech recognition/formatting of speech data transferred from the mobile terminal 101. Upon receiving the TCP/IP packet storing the transmission enable data from the speech control host unit 108, the communication section 111 in the mobile terminal 101 transfers the transmission enable data stored in the TCP/IP packet to the control section 110.

Upon receiving the transmission enable data, the control section 110 in the mobile terminal 101 requests the communication section 111 to transmit, to the speech control host unit 108, speech data input from a microphone by a speech communication operation or a speech input operation in an off-line state.

The communication section 111 transmits the TCP/IP packet storing the speech data to the IP address corresponding to the speech control host unit 108.

This TCP/IP packet is transferred to the packet transmission/reception section 115 in the speech control host unit 108 through the routing section 114 in the mobile terminal control host unit 104, the relay host unit (not shown) in the Internet 105, the router unit 106 in the speech service provider, and the LAN 107 on the basis of the "destination IP address" stored in the TCP/IP packet.

The packet transmission/reception section 115 extracts speech data stored in the received TCP/IP packet and transfers the speech data to the mobile terminal communication control section 116 in the speech control host unit 108.

The mobile terminal communication control section 116 transfers the transferred speech data to a text speech recognition section 117. The text speech recognition section 117 executes text speech recognition processing for the transferred speech data and transfers the recognition result, i.e., recognized speech text data to a formatted text generation section 118. The formatted text generation section 118 determines the field of the recognized speech text data output from the text speech recognition section 117 using the format type data which is designated from the mobile terminal 101 together with the text speech recognition/formatting start request command, and a format type field dictionary. The formatted text generation section 118 also deletes unnecessary words using an unnecessary word dictionary 1505 (FIG. 13), generates formatted text data, and transfers the formatted text data to the mobile terminal communication control section 116.

To generate E-mail text data, the user of the mobile terminal 101 designates "E-mail" as format type data together with a text speech recognition/formatting start request command. Next, the user sequentially pronounces, e.g., "the destination is taro@casio.co.jp", "the carbon copy is hanako@osuga.co.jp", or "the text is . . . " To generate FAX text data, the user sequentially pronounces, e.g., "the destination number is 0425-79-7735", or "the text is . . . " These pronounced contents are recognized as recognized speech text data by the text speech recognition section 117 in the speech control host unit 108. The formatted text generation section 118 determines the recognized speech text data as text data in, e.g., the "To" field, "Cc" field, or "text" field of E-mail text data. The formatted text generation section 118 deletes unnecessary words and generates formatted text data such as "To: taro@casio.co.jp", "Cc: hanako@osuga.co.jp", or "text: . . . " Alternatively, the formatted text generation section 118 determines the recognized speech text data as text data in, e.g., the "destination number" field, or "text" field of FAX text data. The formatted text generation section 118 deletes unnecessary words and generates formatted text data such as "destination number: 0425-79-7735", or "text: . . . "

The mobile terminal communication control section 116 requests to return a TCP/IP packet storing the formatted text data to the mobile terminal 101.

The packet transmission/reception section 115 transmits the corresponding TCP/IP packet to the IP address corresponding to the mobile terminal 101.

Upon receiving the TCP/IP packet storing the formatted text data from the speech control host unit 108, the communication section 111 in the mobile terminal 101 transfers the formatted text data stored in the TCP/IP packet to the control section 110.

The control section 110 in the mobile terminal 101 inserts the formatted text data into text template data of a format type corresponding to the format type data designated by the user in advance and outputs the formatted text data to an output section 112. The output section 112 displays a text corresponding to the formatted text data on an LCD display section. The user can arbitrarily edit this text data.

When the user of the mobile terminal 101 instructs, from the touch panel of the input section 109, transmission of the E-mail text data or FAX text data which has undergone edit processing, the control section 110 requests the communication section 111 to transmit the E-mail text data or FAX text data to the speech control host unit 108. In this case, a "From" field representing the transmission source address is automatically added to the E-mail text data, or transmission source information is automatically added to the FAX text data.

The communication section 111 transmits a TCP/IP packet storing the E-mail text data or FAX text data to the IP address corresponding to the speech control host unit 108.

This TCP/IP packet is transferred to the packet transmission/reception section 115 in the speech control host unit 108 through the routing section 114 in the mobile terminal control host unit 104, the relay host unit (not shown) in the Internet 105, the router unit 106 in the speech service provider, and the LAN 107 on the basis of the "destination IP address" stored in the TCP/IP packet.

The packet transmission/reception section 115 extracts the E-mail text data or FAX text data stored in the received TCP/IP packet and transfers the data to a mail transmission/reception section 119 or a FAX transmission/reception section 120 in the speech control host unit 108.

The mail transmission/reception section 119 inquires of a name solution server (not shown) to convert an E-mail address set in the "To" field and "Cc" field of the E-mail text data into an IP address, and requests the packet transmission/reception section 115 to transmit the E-mail text data to the IP address. The packet transmission/reception section 115 generates a TCP/IP packet storing the E-mail address and transmits the TCP/IP packet to the Internet 105.

The FAX transmission/reception section 120 dials, on a telephone line 121 (FIG. 1), the destination number set in the "destination number" field of the FAX text data, thereby transmitting the FAX text data to a partner FAX apparatus where the call has terminated.

Upon receiving the E-mail text data for the mobile terminal 101 from the Internet 105 through the packet transmission/reception section 115, the mail transmission/reception section 119 spools the data.

Similarly, upon receiving the FAX text data for the mobile terminal 101 from the telephone line 121, the FAX transmission/reception section 120 spools the data.

When the user of the mobile terminal 101 instructs to receive E-mail text data or FAX text data from the touch panel at an arbitrary timing, the control section 110 requests the communication section 111 to transmit a mail reception request command or a FAX reception request command to the speech control host unit 108.

The communication section 111 transmits a TCP/IP packet storing the mail reception request command or FAX reception request command to the IP address corresponding to the speech control host unit 108.

This TCP/IP packet is transferred to the packet transmission/reception section 115 in the speech control host unit 108 through the routing section 114 in the mobile terminal control host unit 104, the relay host unit (not shown) in the Internet 105, the router unit 106 in the speech service provider, and the LAN 107 on the basis of a "destination IP address" stored in the TCP/IP packet.

The packet transmission/reception section 115 extracts the mail reception request command or the FAX reception request command stored in the received TCP/IP packet and transfers the command to the mail transmission/reception section 119 or the FAX transmission/reception section 120 in the speech control host unit 108.

Upon fetching the mail reception request command, the mail transmission/reception section 119 requests the packet transmission/reception section 115 to extract the E-mail text data which has been received for the mobile terminal 101 from a spool file corresponding to the "terminal identification code" transferred from the mobile terminal 101 together with the mail reception request command and transmit the data to the mobile terminal 101.

Similarly, upon fetching the FAX reception request command, the FAX transmission/reception section 120 requests the packet transmission/reception section 115 to extract FAX text data which has been received for the mobile terminal 101 from a spool file corresponding to the "terminal identification code" transferred from the mobile terminal 101 together with the FAX reception request command and transmit the data to the mobile terminal 101.

The packet transmission/reception section 115 generates a TCP/IP packet storing the E-mail text data or the FAX text data and transmits the TCP/IP packet to the IP address corresponding to the mobile terminal 101.

Upon receiving the TCP/IP packet storing the E-mail text data or the FAX text data from the speech control host unit 108, the communication section 111 in the mobile terminal 101 transfers the E-mail text data or the FAX text data to the control section 110.

The control section 110 in the mobile terminal 101 displays the received E-mail text or FAX text on the LCD display section.

In addition to the communication with the speech control host unit 108, the mobile terminal 101 can also freely access a desired resource on the Internet 105 by originating a dial-up call to the mobile terminal control host unit 104 using a home page browser tool of the mobile terminal 101.

Outer Appearance of Mobile Terminal 101

Figure 2:
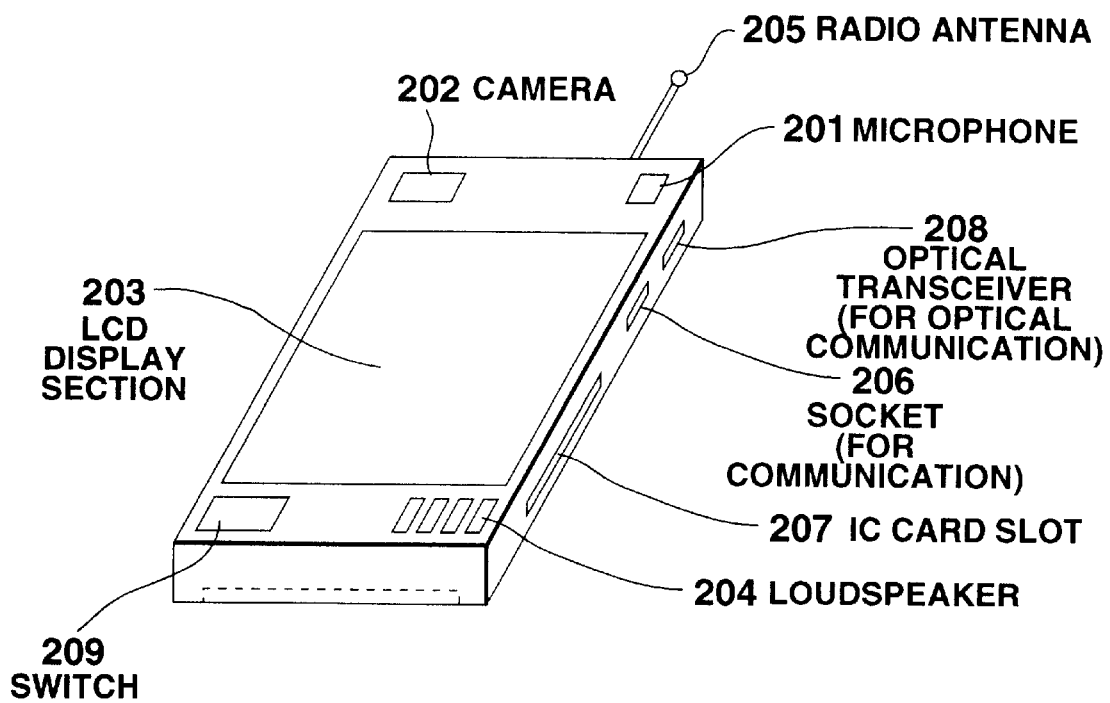
FIG. 2 is a perspective view showing the outer appearance of a mobile terminal.

FIG. 2 is a perspective view showing the outer appearance of the mobile terminal 101 shown in FIG. 1.

The mobile terminal 101 has the outer appearance of a compact portable information management device comprising a microphone 201 also serving as a transmitter for inputting speech data, a camera 202 for inputting image data, an LCD display section 203 which displays various kinds of information and has a touch panel function for receiving touch inputs or pen inputs, and a loudspeaker 204 also serving as a receiver for outputting speech data.

The mobile terminal 101 also has a radio antenna 205 for originating a call to the radio base station 102 shown in FIG. 1, and a socket 206 for connecting the mobile terminal 101 to a wire connection unit in place of the radio base station 102.

The mobile terminal 101 also has an IC card slot 207 for receiving various IC cards, and an optical transceiver 208 for performing infrared optical communication with another mobile terminal 101 or a personal computer.

A switch 209 is a power switch.

Functional Block Diagram of Mobile Terminal 101

Figure 3:
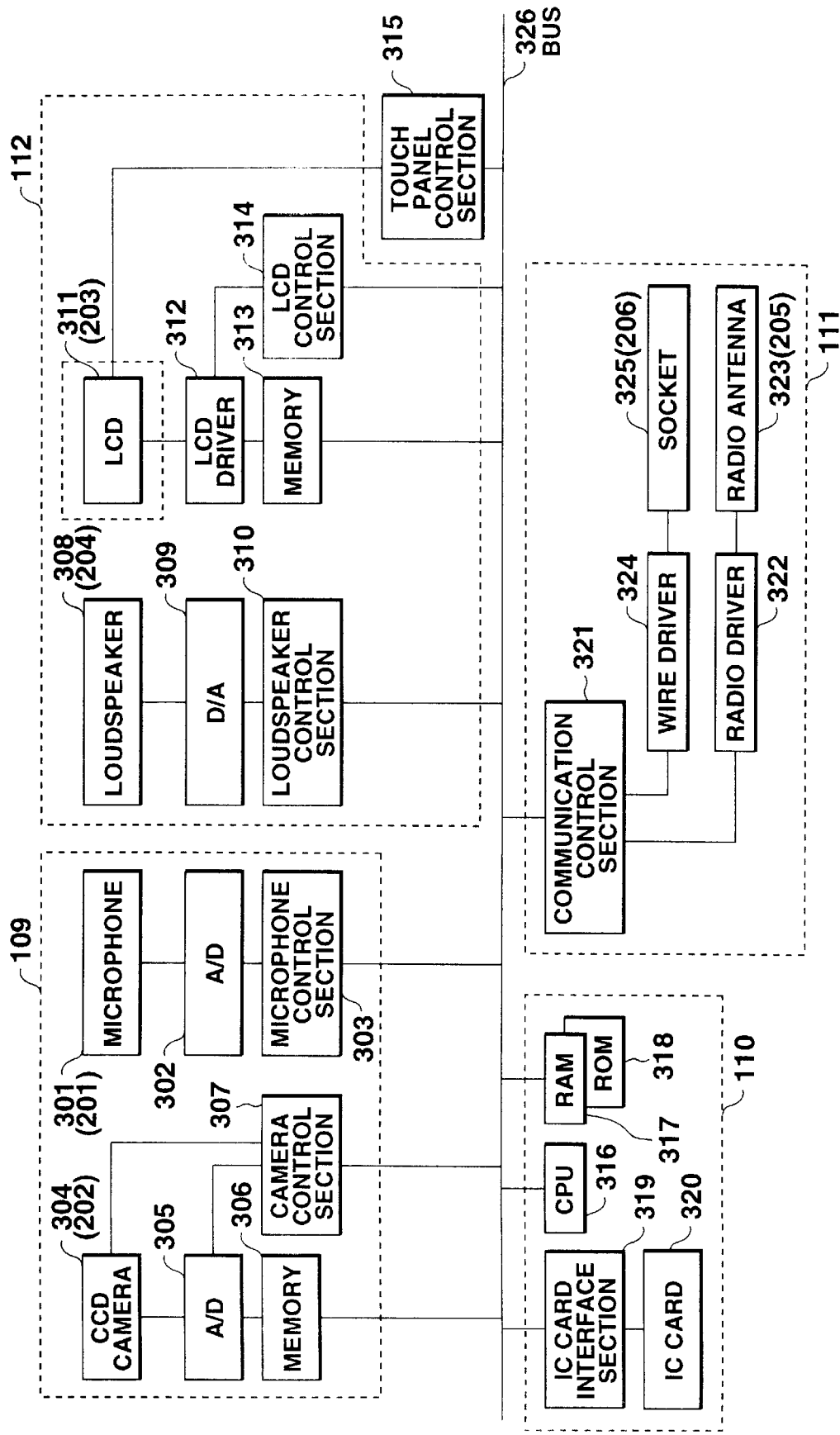
FIG. 3 is a functional block diagram of the mobile terminal.

FIG. 3 is a functional block diagram of the mobile terminal 101.

As shown in FIG. 1, the mobile terminal 101 comprises the input section 109, the control section 110, the communication section 111, and the output section 112, which are connected to each other via a bus 326.

The input section 109 is constituted by a speech input section, an image input section, and a touch panel mechanism (to be described later in association with the operation of the output section 112).

The speech input section comprises a microphone 301, an A/D conversion section 302, and a microphone control section 303.

The microphone 301 (the microphone 301 corresponds to the microphone 201 shown in FIG. 2) also serves as the transmitter of the PHS and is used to input the user's voice.

The A/D conversion section 302 converts an analog speech signal input from the microphone 301 into digital speech data and codes the digital speech data using ADPCM (Adaptive Differential Pulse Code Modulation) as the standard speech coding method of the PHS. This section has already been put into practice as an LSI circuit constituting a PHS terminal.

In speech communication, the microphone control section 303 transfers the coded speech data to a communication control section 321 in the communication section 111 and sends it to a speech channel. In text speech recognition/formatting, the microphone control section 303 transfers the coded speech data to a RAM 317 in the control section 110.

The image input section is constituted by a CCD (Charge Coupled Device) camera 304, an A/D conversion section 305, a memory 306, and a camera control section 307.

The CCD camera 304 picks up an arbitrary image on the basis of the operation of the user.

The A/D conversion section 305 converts an analog image signal picked up by the CCD camera 304 into digital image data.

The memory 306 stores the digital image data in units of frames.

The camera control section 307 controls the operations of the CCD camera 304, the A/D conversion section 305, and the memory 306.

The output section 112 is constituted by a speech output section and an image output section.

The speech output section is constituted by a loudspeaker 308, a D/A conversion section 309, and a loudspeaker control section 310.

The loudspeaker control section 310 transfers PHS speech data received from the communication control section 321 in the communication section 111 or synthesized speech data received from the RAM 317 in the control section 110 to the D/A conversion section 309.

The D/A conversion section 309 decodes the received speech data, converts the data into an analog speech signal, and causes the loudspeaker 308 (the loudspeaker 308 corresponds to the loudspeaker 204 in FIG. 2) to output the speech signal as speech data.

The image output section is constituted by the LCD display section 203, an LCD driver 312, a memory 313, and an LCD control section 314.

The LCD control section 314 causes the memory 313 to hold various image data such as character data, image data, and command button data from the RAM 317 in the control section 110 in units of frames and starts the LCD driver 312.

The LCD driver 312 displays image data read out from the memory 313 in units of frames on an LCD display section 311 (the LCD display section 311 corresponds to the LCD display section 203 in FIG. 2).

A transparent touch panel is arranged on the surface of the LCD display section 311 (203 in FIG. 2). The user can touch the touch panel with a finger or a pen in accordance with, e.g., command button data displayed on the LCD display section 311 to input a command. This input signal is transferred to the RAM 317 in the control section 110 by a touch panel control section 315.

The control section 110 comprises a CPU 316, the RAM 317, a ROM 318, an IC card interface section 319, and an IC card 320 inserted into the IC card slot 207 (FIG. 2) as needed. The IC card interface section 319 controls input/output of data to/from the IC card 320.

The CPU 316 controls the entire operation of the mobile terminal 101 using the RAM 317 as a work area in accordance with a control program stored in the ROM 318.

The communication section 111 comprises the communication control section 321, a radio driver 322, a radio antenna 323, a wire driver 324, and a socket 325.

The communication control section 321 executes PHS speech communication processing or TCP/IP communication processing (to be described later) with the Internet 105 and controls the radio driver 322 or the wire driver 324.

The radio driver 322 performs conversion between communication data and a PHS radio signal transmitted/received through the radio antenna 323 (the radio antenna 323 corresponds to the radio antenna 205 shown in FIG. 2) in the radio communication mode. The PHS radio signal is based on a radio frequency of 1.9 GHz, a carrier frequency interval of 300 kHz, a four-channel/carrier TDMA-TDD radio access scheme, a $\pi/4$-shift QPSK modulation scheme, and a radio transfer rate of 384 kbits/sec.

The wire driver 324 performs conversion between communication data and a wire signal transmitted/received through the socket 325 (the socket 325 corresponds to the socket 206 shown in FIG. 2). This wire signal is a general telephone band modem modulated signal.

The operation of the embodiment of the present invention having the above arrangement will be described below in detail.

Processing in Mobile Terminal 101

Processing in the mobile terminal 101 will be described first.

Figure 4:
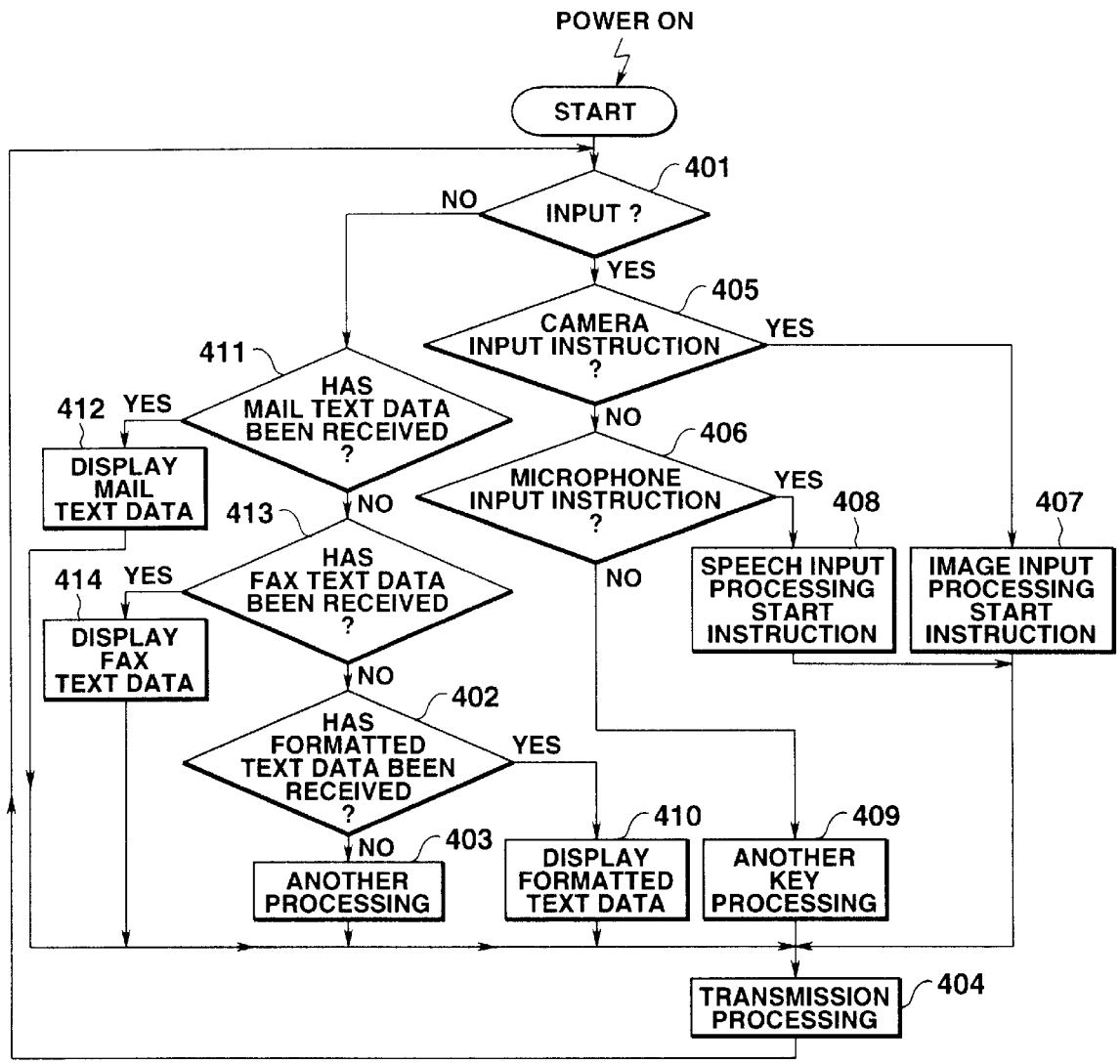
FIG. 4 is a flow chart of the entire processing of the mobile terminal.

FIG. 4 is a flow chart showing the entire control operation realized as an operation of the CPU 316 in the control section 110 shown in FIG. 3, which executes a control program stored in the ROM 318 in the control section 110 after power-ON.

Figure 5:
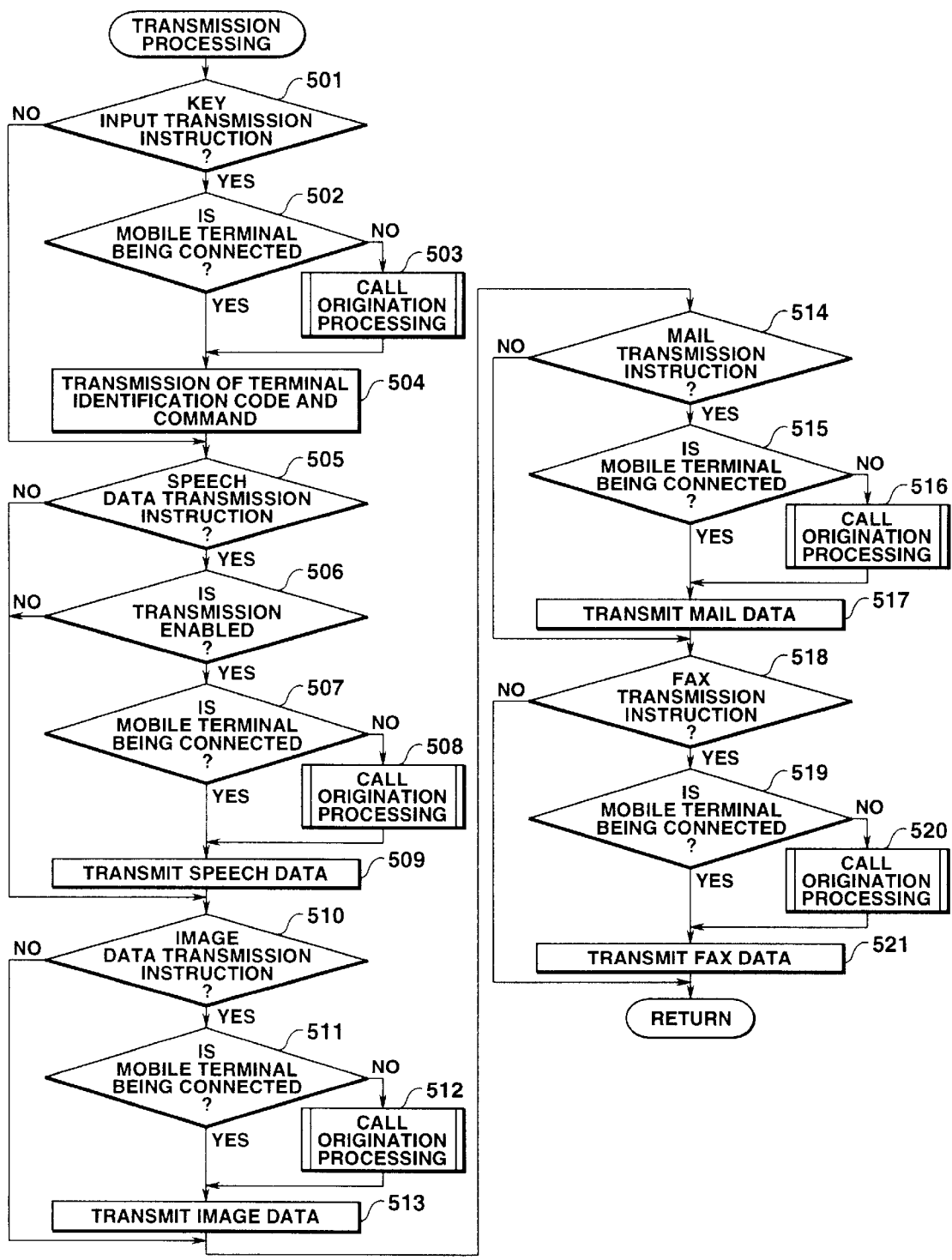
FIG. 5 is a flow chart of transmission processing.
Figure 8:
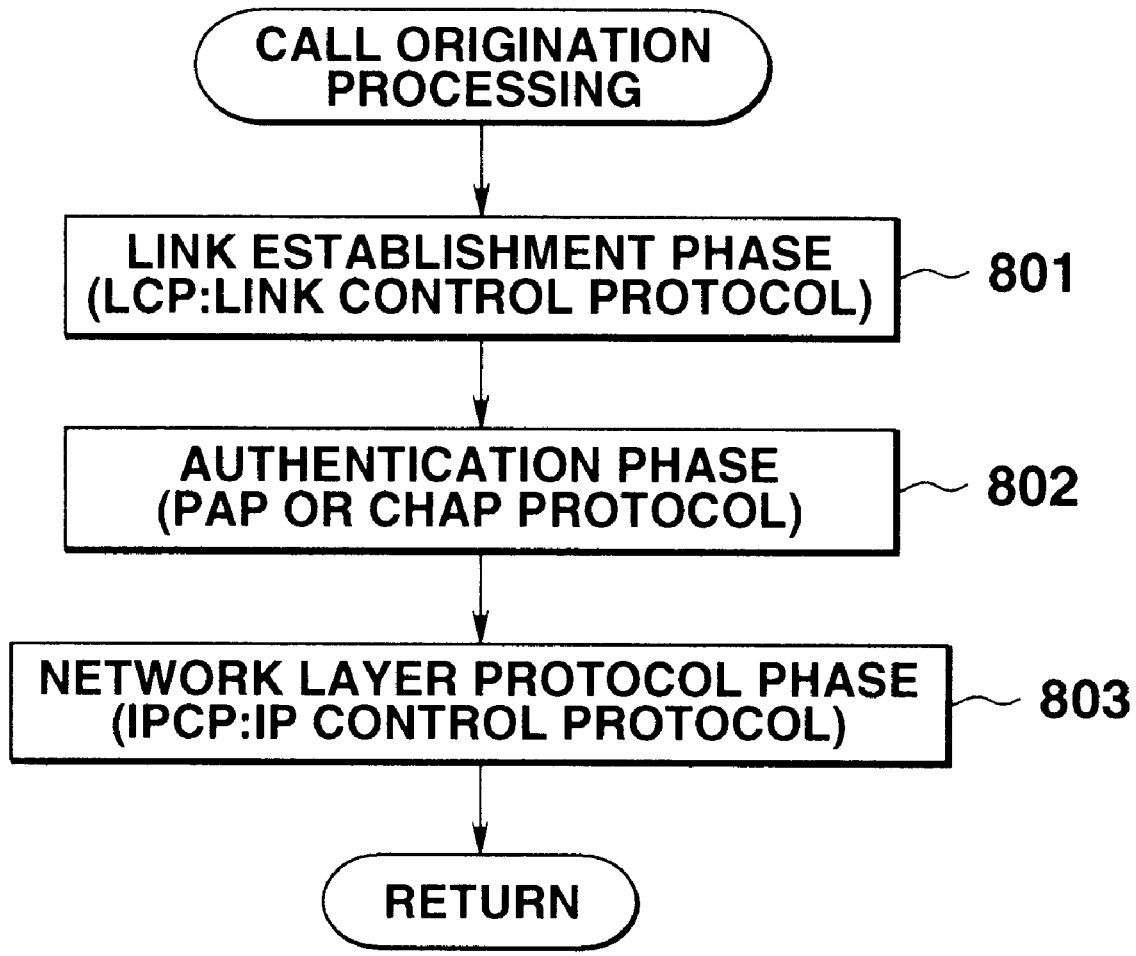
FIG. 8 is a flow chart of call origination processing using PPP.

The control program for realizing functions shown in the flow charts of FIGS. 4, 5, and 8 and data necessary for the program may be stored in the IC card 320 detachably attached to the IC card slot 207 shown in FIG. 2 in the form of program codes which can be read by the CPU 316. The program codes may be directly executed by the CPU 316, or loaded in the RAM 317 or the programmable ROM 318, as needed, and executed by the CPU 316. Alternatively, the control program and data necessary for the program may be received from another device via a radio or wire communication line or from the optical transceiver 208 (FIG. 2) through the communication section 111, loaded in the RAM 317 or the programmable ROM 318, and executed by the CPU 316.

In the repetitive loop of steps 401→411→413→402→403→404→401, determination processing (401) of determining whether the touch panel control section 315 has notified of detection of a touch panel input, determination processing (411) of determining whether E-mail text data has been received from the speech control host unit 108 (FIG. 1), determination processing (413) of determining whether FAX text data has been received, determination processing (402) of determining whether formatted text data has been received, other reception/display processing (403), and transmission processing (404) of transmitting necessary data are executed.

If the touch panel control section 315 has notified of detection of a touch panel input, i.e., YES in step 401, it is determined in step 405 or 406 whether the touch panel input is an input instruction for the CCD camera 304 (202 in FIG. 2) shown in FIG. 3 or an input instruction for the microphone 301 (201 in FIG. 2) shown in FIG. 3.

If the touch panel input is an input instruction for the CCD camera 304 (202 in FIG. 2) shown in FIG. 3, i.e., YES in step 405, the camera control section 307 in the input section 109 shown in FIG. 3 is instructed to start image input processing in step 407. The flow advances to transmission processing in step 404. In step 404, if data to be transmitted is present, transmission is executed. Otherwise, the flow returns to step 401.

If the touch panel input is an input instruction for the microphone 301 (201 in FIG. 2) shown in FIG. 3, i.e., YES in step 406, the microphone control section 303 in the input section 109 shown in FIG. 3 is instructed to start speech input processing in step 408. This speech input processing start instruction corresponds to, e.g., a PHS speech communication processing start instruction or an off-line speech input processing start instruction for executing text speech recognition/formatting.

The microphone control section 303 instructs the microphone 301 (201 in FIG. 2) and the A/D conversion section 302 to start speech input processing in accordance with the instruction from the CPU 316. As a result, speech data input from the microphone 301 (201 in FIG. 2) is output from the A/D conversion section 302.

When the speech input processing start instruction is a PHS speech communication processing start instruction, the speech data is sent to a predetermined speech channel in transmission processing (not shown) by the communication control section 321 and transmitted to the communication partner.

When the speech input processing start instruction contains a speech input processing start instruction for text speech recognition/formatting, speech data input from the microphone 301 (201 in FIG. 2) and output from the microphone control section 303 is transmitted to the speech control host unit 108 in transmission processing in step 404 (to be described later).

If the touch panel input is neither an input instruction for the CCD camera 304 (202 in FIG. 2) shown in FIG. 3 nor an input instruction for the microphone 301 (201 in FIG. 2) shown in FIG. 3, i.e., NO in steps 405 and 406, another key input processing is executed in step 409. Thereafter, the flow advances to transmission processing in step 404.

If the RAM 317 in the control section 110 has received formatted text data from the speech control host unit 108 (FIG. 1) through the communication section 111, i.e., YES in step 402, the formatted text data received by the RAM 317 is inserted into text template data of a format type corresponding to the format type data designated by the user in advance, and transferred from the RAM 317 to the memory 313 in the output section 112, and the LCD control section 314 is instructed to display the data in step 410. The formatted text data output from the memory 313 through the LCD driver 312 is displayed on the LCD display section 311 (203 in FIG. 2) under the control of the LCD control section 314.

If the RAM 317 in the control section 110 has received E-mail text data from the speech control host unit 108 (FIG. 1) through the communication section 111, i.e., YES in step 411, the E-mail text data received by the RAM 317 is transferred from the RAM 317 to the memory 313 in the output section 112, and the LCD control section 314 is instructed to display the data in step 412. The received E-mail text data output from the memory 313 through the LCD driver 312 is displayed on the LCD display section 311 (203 in FIG. 2) under the control of the LCD control section 314.

If the RAM 317 in the control section 110 has received FAX text data from the speech control host unit 108 (FIG. 1) through the communication section 111, i.e., YES in step 413, the FAX text data received by the RAM 317 is transferred from the RAM 317 to the memory 313 in the output section 112, and the LCD control section 314 is instructed to display the data in step 414. The received FAX text data output from the memory 313 through the LCD driver 312 is displayed on the LCD display section 311 (203 in FIG. 2) under the control of the LCD control section 314.

Transmission processing in step 404 will be described next.

FIG. 5 is a flow chart showing details of transmission processing.

It is determined in step 501 whether key inputs from the touch panel, which have been processed by another key input processing in step 409 in FIG. 4, have a transmission instruction. If NO in step 501, the flow advances to step 505.

If YES in step 501, it is determined in step 502 whether the mobile terminal 101 is currently being connected to the mobile terminal control host unit 104 shown in FIG. 1.

If the mobile terminal 101 is being connected to the mobile terminal control host unit 104 in FIG. 1, i.e., YES in step 502, the CPU 316 in the control section 110 shown in FIG. 3 requests the communication control section 321 in the communication section 111 shown in FIG. 3 to transmit the "terminal identification code" of the mobile terminal 101 and a command corresponding to the key input processing in step 504. The communication control section 321 generates a TCP/IP packet storing the "terminal identification code" and the command and transmits the TCP/IP packet to a predetermined host unit (e.g., the speech control host unit 108 shown in FIG. 1) connected to the Internet 105.

If the mobile terminal 101 is not being connected to the mobile terminal control host unit 104 shown in FIG. 1, i.e., NO in step 502, the CPU 316 in the control section 110 shown in FIG. 3 requests the communication control section 321 in the communication section 111 shown in FIG. 3 to originate a call in step 503 and then executes processing in step 504.

As will be described later, a transmission instruction for transmitting a text speech recognition/formatting start request command and format type data based on the instruction of the user, a text speech recognition/formatting end request command transmission instruction, a mail reception request command transmission instruction, and a FAX reception request command transmission instruction are issued in step 504.

As described above, if NO in step 501, processing in step 504 is performed, and it is determined in step 505 whether an instruction for transmitting speech data to the speech control host unit 108 (FIG. 1) has been issued.

If NO in step 505, the flow advances to step 510.

If YES in step 505, it is determined in step 506 whether transmission enable data as a response to the text speech recognition/formatting start request command has already been returned from the speech control host unit 108.

If NO in step 506, i.e., the speech control host unit 108 has not completed preparation for the text speech recognition/formatting start request command from the mobile terminal 101 yet, the flow advances to step 510.

If transmission enable data as a response to the text speech recognition/formatting start request command has already been returned from the speech control host unit 108, i.e., YES in step 506, it is determined in step 507 whether the mobile terminal 101 is currently being connected to the mobile terminal control host unit 104 shown in FIG. 1.

If the mobile terminal 101 is being connected to the mobile terminal control host unit 104 shown in FIG. 1, i.e., YES in step 507, the CPU 316 in the control section 110 shown in FIG. 3 requests the communication control section 321 in the communication section 111 to transmit speech data which has been transferred from the microphone control section 303 in the input section 109 shown in FIG. 3 to the RAM 317 in the control section 110 in step 509. The communication control section 321 generates a TCP/IP packet storing the speech data and transmits the TCP/IP packet to the speech control host unit 108 connected to the Internet 105 shown in FIG. 1.

If the mobile terminal 101 is not being connected to the mobile terminal control host unit 104 shown in FIG. 1, i.e., NO in step 507, the CPU 316 in the control section 110 shown in FIG. 3 requests the communication control section 321 in the communication section 111 shown in FIG. 3 to originate a call in step 508 and then executes processing in step 509.

As will be described later, a speech data transmission instruction for text speech recognition/formatting is issued in step 509.

As described above, if NO in step 505 or 506, processing in step 509 is performed, and it is determined in step 510 whether an image input processing start instruction has been executed, and an instruction for transmitting image data to an image control host unit (not shown) connected to the Internet 105 shown in FIG. 1 has been issued in step 407 in FIG. 4.

If NO in step 510, the flow advances to step 514.

If YES in step 510, it is determined in step 511 whether the mobile terminal 101 is currently being connected to the mobile terminal control host unit 104 shown in FIG. 1.

If the mobile terminal 101 is being connected to the mobile terminal control host unit 104 shown in FIG. 1, i.e., YES in step 511, the CPU 316 in the control section 110 shown in FIG. 3 requests the communication control section 321 in the communication section 111 to transmit image data which has been stored in the memory 306 in the input section 109 shown in FIG. 3 in step 513. The communication control section 321 generates a TCP/IP packet storing the image data and transmits the TCP/IP packet to the speech control host unit (not shown) 108 connected to the Internet 105.

If the mobile terminal 101 is not being connected to the mobile terminal control host unit 104 shown in FIG. 1, i.e., NO in step 511, the CPU 316 in the control section 110 shown in FIG. 3 requests the communication control section 321 in the communication section 111 shown in FIG. 3 to originate a call in step 512, and then executes processing in step 513.

As described above, if NO in step 510, or after processing in step 513, it is determined in step 514 whether the key inputs from the touch panel which have been processed by another key input processing in step 409 shown in FIG. 4 have an E-mail text data transmission instruction.

If NO in step 514, the flow advances to step 518.

If YES in step 514, it is determined in step 515 whether the mobile terminal 101 is currently being connected to the mobile terminal control host unit 104 shown in FIG. 1.

If the mobile terminal 101 is being connected to the mobile terminal control host unit 104 shown in FIG. 1, i.e., YES in step 515, the CPU 316 in the control section 110 shown in FIG. 3 requests the communication control section 321 in the communication section 111 shown in FIG. 3 to transmit E-mail text data corresponding to the key input processing in step 517. In this case, a "From" field representing the transmission source address is automatically added to the E-mail text data. The communication control section 321 generates a TCP/IP packet storing the E-mail text data and transmits the TCP/IP packet to a predetermined host unit (e.g., the speech control host unit 108 shown in FIG. 1) connected to the Internet 105.

If the mobile terminal 101 is not being connected to the mobile terminal control host unit 104 shown in FIG. 1, i.e., NO in step 515, the CPU 316 in the control section 110 shown in FIG. 3 requests the communication control section 321 in the communication section 111 shown in FIG. 3 to originate a call in step 516, and then executes processing in step 517.

As described above, if NO in step 514, or after processing in step 517, it is determined in step 518 whether the key inputs from the touch panel which have been processed by another key input processing in step 409 shown in FIG. 4 have a FAX text data transmission instruction.

If NO in step 518, transmission processing in step 404 shown in FIG. 4 is ended.

If YES in step 518, it is determined in step 519 whether the mobile terminal 101 is currently being connected to the mobile terminal control host unit 104 shown in FIG. 1.

If the mobile terminal 101 is being connected to the mobile terminal control host unit 104 shown in FIG. 1, i.e., YES in step 519, the CPU 316 in the control section 110 shown in FIG. 3 requests the communication control section 321 in the communication section 111 shown in FIG. 3 to transmit FAX text data corresponding to the key input processing in step 521. In this case, transmission source information is automatically added to the FAX text data. The communication control section 321 generates a TCP/IP packet storing the FAX text data and transmits the TCP/IP packet to a predetermined host unit (e.g., the speech control host unit 108 shown in FIG. 1) connected to the Internet 105.

If the mobile terminal 101 is not being connected to the mobile terminal control host unit 104 shown in FIG. 1, i.e., NO in step 519, the CPU 316 in the control section 110 shown in FIG. 3 requests the communication control section 321 in the communication section 111 shown in FIG. 3 to originate a call in step 520, and then executes processing in step 521.

As described above, if NO in step 518, or after processing in step 521, transmission processing in step 404 shown in FIG. 4 is ended.

Format of Communication Data

Figures 6A, 6B, 6C:
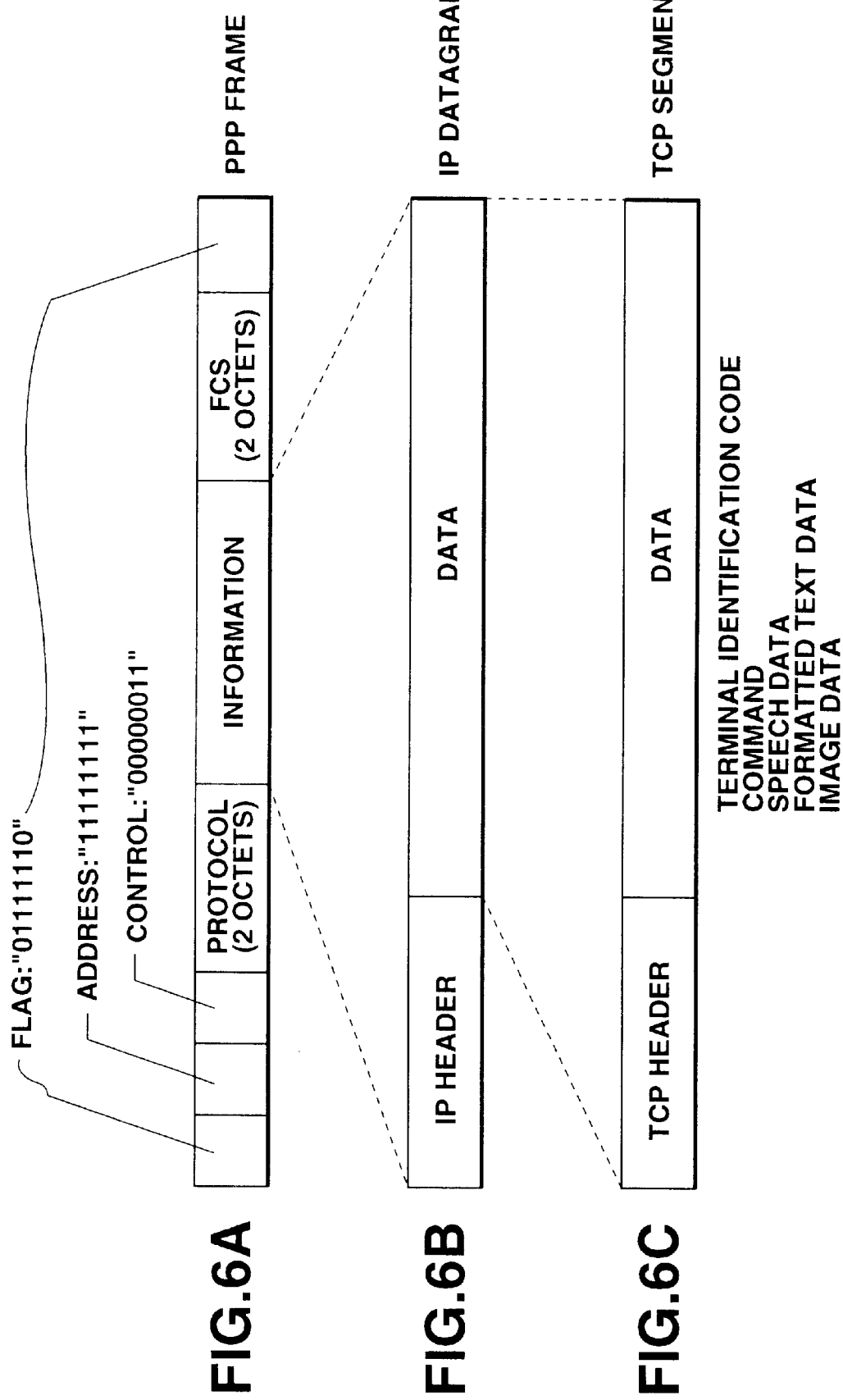
FIGS. 6A, 6B, and 6C are views showing the format of communication data.

FIGS. 6A, 6B, and 6C are views showing the format of communication data transmitted among the mobile terminal 101, the mobile terminal control host unit 104, and the Internet 105 (speech control host unit 108).

Between the mobile terminal 101 and the mobile terminal control host unit 104, communication data is transferred on a digital communication channel having a PHS standard transfer rate of 32 kbits/sec on the basis of a communication protocol called PPP (Point-to-Point Protocol) using a PPP frame (transferred from the left to the right in FIG. 6A) shown in FIG. 6A.

Fixed bit strings shown in FIG. 6A are set for "flag", "address", and "control" fields constituting the PPP frame, respectively. The "FCS" field having a data length of 2 octets is called a frame check sequence and stores an error detection/correction data for the PPP frame data. The "information" field (this field has a variable length) of the PPP frame transferred after a PPP link is established between the mobile terminal 101 and the mobile terminal control host unit 104 stores an IP datagram as a fundamental data transfer unit on the Internet 105 (FIG. 1). In this case, the "protocol" field having a data length of 2 octets stores a hexadecimal value of "0021" representing that the IP datagram is stored in the "information" field.

The IP datagram is stored in the "information" field of the PPP frame, as described above. This IP datagram is the fundamental data transfer unit on the Internet 105, as described above. The IP datagram is defined in accordance with the Internet Protocol (IP) and has a function of uniquely transferring data stored in the "data" field to a destination host unit on the Internet 105, a function of specifying the address on the Internet 105, a function of transferring the IP datagram itself to the host unit designated with a "destination IP address" through a predetermined path on the Internet 105, and a function of fragmenting (dividing) the IP datagram itself and reconstructing the IP datagram.

As shown in FIG. 6B, the IP datagram is constituted by an IP header field and a data field. All pieces of information necessary for transmitting the IP datagram itself which contains the IP header field are stored in the IP header field. FIG. 7A is a view of the format of the IP header.

The IP header has a data length of 5 or 6 words each consisting of 32 bits. This data length is stored in the "header length" field of the first word. The total data length of the IP datagram is stored in the "total IP datagram length" of the first word.

The version of the Internet Protocol (IP) for defining an IP datagram transfer method is set in the "version" field of the first word. The current version is "4".

Information representing the transmission priority or the like is stored in the "service type" field of the first word, although this field is not particularly related to the present invention.

Fields of the second word define control information used when the IP datagram is fragmented (divided) because of a restriction on transfer on the Internet 105. A unique integer for identifying the IP datagram before division to which the IP datagram as a divided fragment belongs is set in the "identification number" field. Offset information representing a portion of the IP datagram before division, which corresponds to the IP datagram as a divided fragment is set in the "fragment offset" field. Whether other fragments constituting the IP datagram before division to which the IP datagram as a divided fragment belongs follow this IP datagram is set in the "flag string" field. Even when the IP datagram is fragmented in a relay host unit on the Internet 105, the IP datagram before division can be properly reconstructed on the reception side on the basis of these information.

Time information in units of seconds which represents the time when the IP datagram is allowed to be present on the Internet 105 is set in the "time to live" (TTL) field of the third word. The relay host unit on the Internet 105 decrements this field value every time an IP datagram is processed. When this value becomes zero or less, the IP datagram is discarded from the Internet 105. With this processing, excess traffic on the Internet 105 can be prevented. Retransmission control for the discarded IP datagram is executed in control processing for TCP segment data stored in the IP datagram.

An integer value for defining the format of data stored in the "data" field of the IP datagram is set in the "protocol" field of the third word. In this embodiment, since TCP segment data is stored in the "data" field of the IP datagram, as shown in FIG. 6C, an integer value of "6" is set to define the format of the data.

Checksum data for detecting an error in the IP header data is set in the "header checksum" field of the third word.

A 32-bit "transmission source IP address" is set in the fourth word. When the IP datagram is to be transferred from the mobile terminal 101 to the speech control host unit 108, an IP address assigned to the mobile terminal 101 by the mobile terminal control host unit 104 in call origination processing (to be described later) is set as a "transmission source IP address". The speech control host unit 108 shown in FIG. 1 stores the "transmission source IP address", so that the speech control host unit 108 can return formatted text data or the like to the mobile terminal 101 through the Internet 105.

A 32-bit "destination IP address" is set in the fifth word. When the IP datagram is to be transferred from the mobile terminal 101 to the speech control host unit 108, an IP address permanently assigned to the speech control host unit 108 is set as a "destination IP address". The routing section 114 in the mobile terminal control host unit 104, relay host units on the Internet 105, and the router unit 106 in the speech service provider identify the "destination IP address" stored in the received IP datagram. With this operation, the IP datagram transmission path can be determined in accordance with path control table information of these units, and finally, the IP datagram can be transferred to the speech control host unit 108 in the speech service provider.

The "IP option" field of the sixth word is optionally arranged to set information for testing or debugging networks constituting the Internet 105 or control information for controlling or monitoring the transmission path on the Internet 105, although the "IP option" field is not particularly related to the present invention.

Padding data for matching the data length is set in the "padding" field of the sixth word.

TCP segment data is stored in the "data" field of the IP datagram. This TCP segment is defined in accordance with a transmission control protocol (TCP) and has a function for transmitting data stored in the "data" field to the destination host unit on the Internet 105 properly in an appropriate order. The IP datagram provides only the function of uniquely transferring data on the Internet 105 and no function of ensuring the reliability of the data (e.g., retransmission control function) while the TCP segment provides a function of ensuring the reliability of the data.

Communication data has a hierarchical structure of a (PPP frame), an IP datagram, and a TCP segment to efficiently cope with different requirements that efficient data transmission under a minimum processing load is necessary on the Internet 105, and end-to-end data transmission must be as reliable as possible. With this arrangement, the relay host unit on the Internet 105 can efficiently transmit information (TCP segment) stored in the "data" field of the IP datagram to the destination host unit as fast as possible by referring to only the IP header of the IP datagram. In end-to-end transmission (between the transmission source host unit and the destination host unit), highly reliable data communication such as retransmission control can be realized by referring to only the TCP header of the TCP segment.

As shown in FIG. 6C, the TCP segment is constituted by a TCP header field and a data field. FIG. 7B is a view of the format of the TCP header.

Like the IP header, the TCP header has a data length of 5 or 6 words each consisting of 32 bits. This data length is stored in the "header length" field of the fourth word. The total data length of the IP datagram is stored in the "total IP datagram length" of the first word.

A 16-bit integer value for specifying a communication protocol for text speech recognition/formatting, a 16-bit integer value for specifying a mail transmission protocol (e.g., SMTP: Simple Mail Transfer Protocol), a 16-bit integer value for specifying a mail reception protocol (e.g., POP3), or a 16-bit integer value for specifying a FAX communication protocol is set in the "transmission source port number" field and the "destination port number" field of the first word.

The packet transmission/reception section 115 (FIG. 1) in the speech control host unit 108 recognizes the value set in the "destination port number" field of the TCP header of the received TCP segment, thereby determining an application executed by the speech control host unit 108 as a transfer destination of data stored in the "data" field of the TCP segment.

When the value set in the "destination port number" field of the TCP header of the received TCP segment corresponds to the communication protocol for text speech recognition/formatting, the packet transmission/reception section 115 can transfer speech data stored in the "data" field of the TCP segment to the mobile terminal communication control section 116. When the value corresponds to the above-described mail transmission protocol or mail reception protocol, the packet transmission/reception section 115 can transfer E-mail text data or a mail reception request command stored in the "data" field of the TCP segment to the mail transmission/reception section 119. When the value corresponds to the above-described FAX communication protocol, the packet transmission/reception section 115 can transfer FAX text data or a FAX reception request command stored in the "data" field of the TCP segment to the FAX transmission/reception section 120.

Similarly, the communication control section 321 (FIG. 3) in the communication section 111 of the mobile terminal 101 recognizes the value set in the "destination port number" field of the TCP header of the received TCP segment, thereby determining an application executed by the movable terminal 101 as a transfer destination of data stored in the "data" field of the TCP segment.

When the value set in the "destination port number" field of the TCP header of the received TCP segment corresponds to the communication protocol for text speech recognition/formatting, the communication control section 321 can notify the control section 110 (FIG. 1 or 3) of reception of data for text speech recognition/formatting and transfer formatted text data stored in the "data" field of the TCP segment. When the value corresponds to the above-described mail transmission protocol or mail reception protocol, the communication control section 321 can notify the control section 110 (FIG. 1 or 3) of reception of data for E-mail transmission/reception processing and transfer E-mail text data stored in the "data" field of the TCP segment. When the value corresponds to the FAX communication protocol, the communication control section 321 can notify the control section 110 (FIG. 1 or 3) of reception of data for FAX transmission/reception processing and transfer FAX text data stored in the "data" field of the TCP segment.

The packet transmission/reception section 115 in the speech control host unit 108 and the communication control section 321 in the communication section 111 of the mobile terminal 101 confirm the "transmission source port number" set in the TCP header of the received TCP segment, thereby confirming the protocol of the application of the transmission source.

The "sequence number" field of the second word of the TCP header shown in FIG. 7B is a field for notifying, from the transmission side, the reception side of the byte position of the start of the data stored in the "data" field of the TCP segment in the entire byte stream transmitted from the transmission side to the reception side in the current TCP connection. Inversely, the "confirmation response number" field of the third word is a field for notifying, from the reception side, the transmission side of the byte position of the data which has received without any error in the entire byte stream transmitted from the transmission side to the reception side in the current TCP connection. With this arrangement, speech data, E-mail text data, or FAX text data can be reliably transferred in the proper order from, e.g., the mobile terminal 101 to the speech control host unit 108.

A value representing the type of the TCP segment is set in the "flag string" field of the fourth word. In TCP communication, various control data for confirmation response are transmitted at, e.g., the start or end of connection. The type of control data is set in the "flag string" field.

The "window" field of the fourth word is a field for notifying, from the reception side, the transmission side of window data representing the number of bytes which can be currently continuously received on the reception side. With this arrangement, data flow control from the reception side to the transmission side is enabled, so that fine control for, e.g., suppressing transmission of speech data, E-mail text data, or FAX text data to the mobile terminal 101 when the load on the speech control host unit 108 is large.

The "reserved" field of the fourth word is a field for reservation.

Checksum data for detecting errors in the TCP header and data stored in the "data" field is set in the "checksum" field of the fifth word. With this arrangement, e.g., the speech control host unit 108 can properly receive speech data from the mobile terminal 101.

The "emergency pointer" field of the fifth word stores control data for transmitting emergency data (e.g., interrupt data or abort data), although this field is not particularly related to the present invention.

The "option" field of the sixth word is used to, e.g., designate the maximum segment length which can be transmitted between the transmission and reception units, although this field is not particularly related to the present invention.

Padding data for matching the data length is set in the "padding" field of the sixth word.

In the mobile terminal 101, the TCP segment communication (terminating) processing function having the above arrangement is realized by the communication control section 321 (FIG. 3) in the communication section 111. In the speech control host unit 108, this function is realized by the packet transmission/reception section 115 (FIG. 1). The control program executed by the CPU 316 in the mobile terminal 101 may realize the above processing function.

Call Origination Processing

As described above, in transmission processing shown in FIG. 5, if the mobile terminal 101 is not being connected to the mobile terminal control host unit 104, i.e., NO in step 502, 507, 511, 515, or 519, the CPU 316 (FIG. 3) in the control section 110 of the mobile terminal 101 requests the communication control section 321 in the communication section 111 shown in FIG. 3 to originate a call in step 503, 508, 512, 516, or 520. FIG. 8 is a flow chart showing call origination processing executed by the communication control section 321 in response to this request.

In step 801, a link establishment phase is executed. In this phase, a dial-up call is automatically originated for the access telephone number of the mobile terminal control host unit 104. After the call has terminated at the mobile terminal control host unit 104, negotiation associated with determination of the maximum data length of a PPP frame (FIG. 6A) used for communication, determination of nontransmission characters which are to be escaped, determination of the presence/absence of compression of data length of the "protocol" field (FIG. 6A) of the PPP frame from 2 octets to 1 octet, determination of the presence/absence of omission (compression) of the "address" field (FIG. 6A) having a fixed value of "11111111" from the PPP frame, and the like is executed between the communication control section 321 and the connection establishment section 113 (FIG. 1) in the mobile terminal control host unit 104 using a protocol called a link control protocol (LCP). In this case, communication between the communication control section 321 in the communication section 111 of the mobile terminal 101 and the connection establishment section 113 in the mobile terminal control host unit 104 is executed using a PPP frame having the format shown in FIG. 6A while setting a hexadecimal value of "C021" for specifying the LCP in the "protocol" field of the PPP frame and necessary control data in the "information" field of the PPP frame.

An authentication phase is executed in step 802. In this phase, the user who is using the mobile terminal 101 is authenticated by the connection establishment section 113 (FIG. 1) in the mobile terminal control host unit 104 for the mobile terminal 101 using an authentication protocol called PAP (Password Authentication Protocol) or CHAP (Challenge Handshake Authentication Protocol). With this processing, the Internet provider operating the mobile terminal control host unit 104 can determine whether the user who is using the mobile terminal 101 is a user as a subscriber. In this case, communication between the communication control section 321 in the communication section 111 of the mobile terminal 101 and the connection establishment section 113 in the mobile terminal control host unit 104 is executed using a PPP frame having the format shown in FIG. 6A while setting a hexadecimal value of "C023" for specifying PAP of a hexadecimal value of "C223" for specifying CHAP in the "protocol" field of the PPP frame and necessary authentication data in the "information" field of the PPP frame.

Finally, a network layer protocol phase is executed in step 803. In this embodiment, in this network layer protocol phase, the presence/absence of compression of the TCP header (FIG. 7B) is determined using a protocol called IP control protocol (IPCP). In addition, one of free (unused) IP addresses which can be assigned by the mobile terminal control host unit 104 is assigned to the mobile terminal 101, and necessary path information is set in the communication control section 321 (FIG. 3) in the communication section 111 of the mobile terminal 101 and the routing section 114 (FIG. 1) in the mobile terminal control host unit 104. Thereafter, the mobile terminal 101 can access the speech control host unit 108 connected to the Internet 105 and an arbitrary resource desired by the user on the Internet 105. In this case, communication between the communication control section 321 in the communication section 111 of the mobile terminal 101 and the connection establishment section 113 in the mobile terminal control host unit 104 is executed using a PPP frame having the format shown in FIG. 6A while setting a hexadecimal value of "8021" for specifying IPCP in the "protocol" field of the PPP frame and necessary data for IP address negotiation in the "information" field of the PPP frame.

With the above series of operations, the mobile terminal 101 can transmit/receive a PPP frame storing a TCP/IP packet for communication to/from the routing section 114 in the mobile terminal control host unit 104, so that the mobile terminal 101 can freely access resources on the Internet 105.

To enable access to the speech control host unit 108 or the like in PHS speech communication as well, the mobile terminal 101 may have, e.g., a two-channel simultaneous communication function.

When no transmitted/received data is detected for a predetermined time (e.g., 10 minutes), the communication control section 321 (FIG. 3) in the communication section 111 of the mobile terminal 101 may automatically disconnect the PPP link from the mobile terminal control host unit 104.

Details of Transmission/reception Processing of Mobile Terminal 101 Associated with Text Speech Recognition/Formatting Details of transmission/reception processing executed by the mobile terminal 101 when and after the user operates the touch panel of the mobile terminal 101 to designate a format type and the start of text speech recognition/formatting will be described.

In the control operation corresponding to the above-described flow chart shown in FIG. 4, in which the touch panel operation is detected by the touch panel control section 315 shown in FIG. 3 and executed by the CPU 316 (FIG. 3) in the control section 110, the above-described touch panel operation is detected when YES in step 401 and NO in steps 405 and 406, and another key input processing is executed in step 409. In transmission processing in step 404, if YES in step 501 shown in FIG. 5, and call origination processing is executed in step 503 as needed, the communication control section 321 in the communication section 111 shown in FIG. 3 is requested to transmit the "terminal identification code" of the mobile terminal 101 and a command and data corresponding to the key input processing for instructing to start text speech recognition/formatting in step 504.

Consequently, the communication control section 321 generates a TCP segment having the format shown in FIG. 6C. In this case, a 16-bit integer value for specifying a communication protocol for text speech recognition/formatting is set in the "transmission source port number" field and the "destination port number" field of the TCP header having the format shown in FIGS. 6C and 7B. A "terminal identification code" (e.g., PHS telephone number) for specifying the mobile terminal 101, a text speech recognition/formatting start request command based on the instruction of the user, and format type data based on the instruction of the user are stored in the "data" field of the TCP segment.

Next, the communication control section 321 generates an IP datagram having the format shown in FIG. 6B in which the TCP segment is stored in the "data" field. In this case, an integer value of "6" for defining the format of the TCP segment data stored in the "data" field is set in the "protocol" field of the IP header having the format shown in FIGS. 6B and 7A. An IP address assigned to the communication control section 321 in the communication section 111 of the mobile terminal 101 by the connection establishment section 113 in the mobile terminal control host unit 104 in call origination processing (see the description about step 803 in FIG. 8) which has already been executed is set in the "transmission source IP address" field. An IP address assigned to the speech control host unit 108 is set in the "destination IP address" field.

The communication control section 321 generates a PPP frame having the format shown in FIG. 6A, in which the IP datagram is stored in the "information" field, and a hexadecimal value of "0021" representing that the IP datagram is stored in the "information" field is stored in the "protocol" field, and transmits the PPP frame to the mobile terminal control host unit 104 in accordance with path information (see the description about step 803 in FIG. 8) set in the communication control section 321. A data unit constituted by the TCP segment, the IP datagram, and the PPP frame and transferred in the Internet 105 will be simply referred to as a TCP/IP packet hereinafter.

This TCP/IP packet is transferred to the router unit 106 in the speech service provider by the routing section 114 in the mobile terminal control host unit 104 and the relay host unit (not shown) in the Internet 105 on the basis of the "destination IP address" stored in the IP header of the IP datagram constituting the TCP/IP packet, and then transferred to the packet transmission/reception section 115 in the speech control host unit 108 through the LAN 107.

The packet transmission/reception section 115 identifies that the IP address of the speech control host unit 108, i.e., the packet transmission/reception section 115 itself is set in the "destination IP address" field of the IP header of the IP datagram constituting the transferred TCP/IP packet, thereby receiving the TCP/IP packet.

The packet transmission/reception section 115 confirms that the 16-bit integer value for specifying the communication protocol for text speech recognition/formatting is set in the "destination port number" field and the "transmission source port number" field of the TCP segment constituting the received TCP/IP packet, thereby notifying the mobile terminal communication control section 116 (FIG. 1) of the reception.

Upon this notification, the packet transmission/reception section 115 extracts the "transmission source IP address" from the IP header of the IP datagram constituting the received TCP/IP packet and also extracts the "terminal identification code", the text speech recognition/formatting start request command, and the format type data from the "data" field of the TCP segment constituting the TCP/IP packet, and transfers these data to the mobile terminal communication control section 116.

As a result, a TCP/IP packet storing transmission enable data is returned from the speech control host unit 108 to the mobile terminal 101 in a way to be described later.

This TCP/IP packet is transferred to the routing section 114 in the mobile terminal control host unit 104 by the router unit 106 in the speech service provider and the relay host unit (not shown) in the Internet 105 on the basis of the "destination IP address" stored in the IP header of the IP datagram constituting the TCP/IP packet, and then transferred to the communication control section 321 (FIG. 3) in the communication section 111 of the mobile terminal 101 through the PHS network 103 (FIG. 1).

The communication control section 321 in the communication section 111 of the mobile terminal 101 identifies that the IP address (temporarily or dynamically) assigned to the mobile terminal 101, i.e., the communication control section 321 itself is set in the "destination IP address" field of the IP header of the IP datagram constituting the transferred TCP/IP packet, thereby receiving the TCP/IP packet.

The communication control section 321 confirms that the 16-bit integer value for specifying the communication protocol for text speech recognition/formatting is set in the "destination port number" field and the "transmission source port number" field of the TCP segment constituting the received TCP/IP packet, thereby notifying the CPU 316 in the control section 110 of the mobile terminal 101 of the reception.

Upon this notification, the communication control section 321 extracts the transmission enable data from the "data" field of the TCP segment constituting the received TCP/IP packet and transfers the data to the CPU 316.

The CPU 316 processes the reception notification and transmission enable data in step 403 shown in FIG. 4 and stores the transmission enable data in the RAM 317.

When the user operates the touch panel of the mobile terminal 101 to instruct to start text speech recognition/formatting, the CPU 316 instructs the microphone control section 303 in the input section 109 shown in FIG. 3 to start PHS speech communication processing or off-line speech input processing for executing text speech recognition/formatting. With this processing, the user starts to input speech data from the microphone 301 by the speech communication operation or the off-line speech input operation.

Thereafter, in transmission processing in step 404 executed by the CPU 316 as part of the repetitive loop of steps 401→402→403→404→401 in FIG. 4, when YES in steps 505 and 506 shown in FIG. 5, and call origination processing is executed again in step 508 as needed, the communication control section 321 in the communication section 111 is requested to transmit the speech data transferred from the microphone control section 303 in the input section 109 shown in FIG. 3 to the RAM 317 in the control section 110 in step 509.

Consequently, the communication control section 321 generates a TCP segment having the format shown in FIG. 6C. In this case, a 16-bit integer value for specifying a communication protocol for text speech recognition/formatting is set in the "transmission source port number" field and the "destination port number" field of the TCP header having the format shown in FIGS. 6C and 7B. The speech data transferred from the microphone control section 303 in the input section 109 shown in FIG. 3 to the RAM 317 in the control section 110 is stored in the "data" field of the TCP segment.

Next, the communication control section 321 generates an IP datagram having the format shown in FIG. 6B in which the TCP segment is stored in the "data" field. In this case, an integer value of 6 for defining the format of the TCP segment data stored in the "data" field is set in the "protocol" field of the IP header having the format shown in FIGS. 6B and 7A. An IP address assigned to the communication control section 321 in the communication section 111 of the mobile terminal 101 by the connection establishment section 113 in the mobile terminal control host unit 104 in call origination processing (see the description about step 803 in FIG. 8) which has already been executed is set in the "transmission source IP address" field. An IP address assigned to the speech control host unit 108 is set in the "destination IP address" field.

The communication control section 321 generates a PPP frame having the format shown in FIG. 6A, in which the IP datagram is stored in the "information" field, and a hexadecimal value of "0021" representing that the IP datagram is stored in the "information" field is stored in the "protocol" field, and transmits the PPP frame to the mobile terminal control host unit 104 in accordance with path information (see the description about step 803 in FIG. 8) set in the communication control section 321.

This TCP/IP packet is transferred to the router unit 106 in the speech service provider by the routing section 114 in the mobile terminal control host unit 104 and the relay host unit (not shown) in the Internet 105 on the basis of the "destination IP address" stored in the IP header of the IP datagram constituting the TCP/IP packet, and then transferred to the packet transmission/reception section 115 in the speech control host unit 108 through the LAN 107.

The packet transmission/reception section 115 identifies that the IP address of the speech control host unit 108, i.e., the packet transmission/reception section 115 itself is set in the "destination IP address" field of the IP header of the IP datagram constituting the transferred TCP/IP packet, thereby receiving the TCP/IP packet.

The packet transmission/reception section 115 confirms that the 16-bit integer value for specifying the communication protocol for text speech recognition/formatting is set in the "destination port number" field and the "transmission source port number" field of the TCP segment constituting the received TCP/IP packet, thereby notifying the mobile terminal communication control section 116 (FIG. 1) of the reception.

Upon this notification, the packet transmission/reception section 115 extracts the "transmission source IP address" from the IP header of the IP datagram constituting the received TCP/IP packet and also extracts the speech data from the "data" field of the TCP segment constituting the TCP/IP packet, and transfers these data to the mobile terminal communication control section 116.

As a result, the mobile terminal communication control section 116 controls text speech recognition/formatting in a manner to be described later, causes the text speech recognition section 117 to recognize the received speech data, and causes the formatted text generation section 118 to format resultant recognized speech text data. The mobile terminal communication control section 116 returns a TCP/IP packet storing formatted text data obtained from the formatted text generation section 118 to the mobile terminal 101 in a way to be described later.

This TCP/IP packet is transferred to the routing section 114 in the mobile terminal control host unit 104 by the router unit 106 in the speech service provider and the relay host unit (not shown) in the Internet 105 on the basis of the "destination IP address" stored in the IP header of the IP datagram constituting the TCP/IP packet, and then transferred to the communication control section 321 (FIG. 3) in the communication section 111 of the mobile terminal 101 through the PHS network 103 (FIG. 1).

The communication control section 321 in the communication section 111 of the mobile terminal 101 identifies that the IP address (temporarily or dynamically) assigned to the mobile terminal 101, i.e., the communication control section 321 itself is set in the "destination IP address" field of the IP header of the IP datagram constituting the transferred TCP/IP packet, thereby receiving the TCP/IP packet.

The communication control section 321 confirms that the 16-bit integer value for specifying the communication protocol for text speech recognition/formatting is set in the "destination port number" field and the "transmission source port number" field of the TCP segment constituting the received TCP/IP packet, thereby notifying the CPU 316 in the control a section 110 of the mobile terminal 101 of the reception.

Upon this notification, the communication control section 321 extracts the transmission enable data from the "data" field of the TCP segment constituting the received TCP/IP packet and transfers the data to the CPU 316.

The CPU 316 processes the reception notification and formatted text data in step 402 shown in FIG. 4 and displays the formatted text data on the LCD display section 311 (203 in FIG. 2).

The user can operate the touch panel of the mobile terminal 101 to instruct the speech control host unit 108 to execute a text speech recognition/formatting end request command for ending text speech recognition/formatting.

In the control operation corresponding to the above-described flow chart shown in FIG. 4, in which the touch panel operation is detected by the touch panel control section 315 shown in FIG. 3 and executed by the CPU 316 (FIG. 3) in the control section 110, the above-described touch panel operation is detected when YES in step 401 and NO in steps 405 and 406, and another key input processing is executed in step 409. In transmission processing in step 404, if YES in step 501 shown in FIG. 5, and call origination processing is executed in step 503 as needed, the communication control section 321 in the communication section 111 shown in FIG. 3 is requested to transmit the "terminal identification code" of the mobile terminal 101 and a text speech recognition/formatting end request command in step 504.

Consequently, the communication control section 321 generates a TCP segment having the format shown in FIG. 6C in which the "terminal identification code" for specifying the mobile terminal 101 and the text speech recognition/formatting end request command are stored in the "data" field. Next, the communication control section 321 generates an IP datagram having the format shown in FIG. 6B in which the TCP segment is stored in the "data" field. The communication control section 321 also generates a PPP frame having the format shown in FIG. 6A in which the IP datagram is stored in the "information" field. The communication control section 321 transmits a TCP/IP packet constituted by the TCP segment, the IP datagram, and the PPP frame. In this case, information set in the TCP header (FIGS. 6C and 7B), the IP header (FIGS. 6B and 7A), and the "protocol" field (FIG. 6A) are the same as those set in transmission of the text speech recognition/formatting start request command.

As a result, the TCP/IP packet is transferred to the packet transmission/reception section 115 in the speech control host unit 108 through the Internet 105, like the TCP/IP packet storing the text speech recognition/formatting start request command.

The packet transmission/reception section 115 receives the transferred TCP/IP packet and notifies the mobile terminal communication control section 116 (FIG. 1) of the reception, as in transfer of the TCP/IP packet storing the text speech recognition/formatting start request command.

Upon this notification, the packet transmission/reception section 115 extracts the "terminal identification code and the text speech recognition/formatting end request command from the "data" field of the TCP segment constituting the received TCP/IP packet and transfers these data to the mobile terminal communication control section 116.

As a result, the mobile terminal communication control section 116 ends text speech recognition/formatting for the mobile terminal 101 in a way to be described later.

Details of E-mail Text Data or FAX Text Data Transmission/Reception Processing of Mobile Terminal 101

Details of an operation of the mobile terminal 101 which is performed when the user operates the touch panel of the mobile terminal 101 to instruct to transmit E-mail text data or FAX text data which has already been edited will be described next.

In the control operation corresponding to the above-described flow chart shown in FIG. 4, in which the touch panel operation is detected by the touch panel control section 315 shown in FIG. 3 and executed by the CPU 316 (FIG. 3) in the control section 110, the above-described touch panel operation is detected when YES in step 401 and NO in steps 405 and 406, and another key input processing is executed in step 409. In transmission processing in step 404, if YES in step 514 (in case of E-mail text data) shown in FIG. 5 or step 518 (in case of FAX text data), and call origination processing is executed in step 516 or 520 as needed, the communication control section 321 in the communication section 111 shown in FIG. 3 is requested to transmit E-mail text data or FAX text data in step 517 or 521. As described above, a "From" field representing the transmission source address is automatically added to the E-mail text data, or transmission source information is automatically added to the FAX text data.

Consequently, the communication control section 321 generates a TCP segment having the format shown in FIG. 6C. In this case, a 16-bit integer value for specifying a mail transmission protocol (e.g., SMTP) or a 16-bit integer value for specifying a FAX communication protocol is set in the "transmission source port number" field and the "destination port number" field of the TCP header having the format shown in FIGS. 6C and 7B. E-mail text data or FAX text data is set in the "data" field of the TCP segment.

Next, the communication control section 321 generates an IP datagram having the format shown in FIG. 6B in which the TCP segment is stored in the "data" field. The communication control section 321 also generates a PPP frame having the format shown in FIG. 6A in which the IP datagram is stored in the "information" field. The communication control section 321 transmits a TCP/IP packet constituted by the TCP segment, the IP datagram, and the PPP frame. In this case, the pieces of information set in the IP header (FIGS. 6B and 7A) and the "protocol" field (FIG. 6A) are the same as those set in transmission of speech data in text speech recognition/formatting.

As a result, the TCP/IP packet is transferred to the packet transmission/reception section 115 in the speech control host unit 108 through the Internet 105, like the TCP/IP packet storing speech data in text speech recognition/formatting.

The packet transmission/reception section 115 identifies that the IP address of the speech control host unit 108, i.e., the packet transmission/reception section 115 itself is set in the "destination IP address" field of the IP header of the IP datagram constituting the transferred TCP/IP packet, thereby receiving the TCP/IP packet.

The packet transmission/reception section 115 confirms that the 16-bit integer value for specifying the mail transmission protocol or the 16-bit integer value for specifying the FAX communication protocol is set in the "transmission source port number" field and the "destination port number" field of the TCP segment constituting the received TCP/IP packet, thereby notifying the mail transmission/reception section 119 or the FAX transmission/reception section 120 of the reception.

Upon this notification, the packet transmission/reception section 115 extracts the "transmission source IP address"

from the IP header of the IP datagram constituting the received TCP/IP packet and E-mail text data or FAX text data from the "data" field of the TCP segment constituting the TCP/IP packet and transfers these data to the mail transmission/reception section 119 or the FAX transmission/reception section 120.

As a result, the mail transmission/reception section 119 or the FAX transmission/reception section 120 executes transmission processing (to be described later) for the E-mail text data or the FAX text data.

Details of an operation of the mobile terminal 101 which is performed when the user operates the touch panel of the mobile terminal 101 to instruct to receive E-mail text data or FAX text data will be described next.

In the control operation corresponding to the above-described flow chart shown in FIG. 4, in which the touch panel operation is detected by the touch panel control section 315 shown in FIG. 3 and executed by the CPU 316 (FIG. 3) in the control section 110, the above-described touch panel operation is detected when YES in step 401 and NO in steps 405 and 406, and another key input processing is executed in step 409. In transmission processing in step 404, if YES in step 501 shown in FIG. 5, and call origination processing is executed in step 503 as needed, the communication control section 321 in the communication section 111 shown in FIG. 3 is requested to transmit a mail reception request command or a FAX reception request command in step 504.

Consequently, the communication control section 321 generates a TCP segment having the format shown in FIG. 6C in which a "terminal identification code" for specifying the mobile terminal 101 and a mail reception request command or a FAX reception request command are stored in the "data" field. Next, the communication control section 321 generates an IP datagram having the format shown in FIG. 6B in which the TCP segment is stored in the "data" field, generates a PPP frame having the format shown in FIG. 6A in which the IP datagram is stored in the "information" field, and transmits a TCP/IP packet constituted by the TCP segment, the IP datagram, and the PPP frame. In this case, information set in the TCP header (FIGS. 6C and 7B), the IP header (FIGS. 6B and 7A), and the "protocol" field (FIG. 6A) are the same as those set in transmission of E-mail text data or FAX text data.

As a result, the TCP/IP packet is transferred to the packet transmission/reception section 115 in the speech control host unit 108 through the Internet 105, as in transmission of E-mail text data or FAX text data.

The packet transmission/reception section 115 identifies that the IP address of the speech control host unit 108, i.e., the packet transmission/reception section 115 itself is set in the "destination IP address" field of the IP header of the IP datagram constituting the transferred TCP/IP packet, thereby receiving the TCP/IP packet.

The packet transmission/reception section 115 confirms that the 16-bit integer value for specifying the mail reception protocol or the 16-bit integer value for specifying the FAX communication protocol is set in the "destination port number" field and the "transmission source port number" field of the TCP segment constituting the received TCP/IP packet, thereby notifying the mail transmission/reception section 119 or the FAX transmission/reception section 120 of the reception.

Upon this notification, the packet transmission/reception section 115 extracts the "transmission source IP address" from the IP header of the IP datagram constituting the received TCP/IP packet and the "terminal identification code" and the mail reception request command or the FAX reception request command from the "data" field of the TCP segment constituting the TCP/IP packet, and transfers these data to the mail transmission/reception section 119 or the FAX transmission/reception section 120.

Upon fetching the mail reception request command or the FAX reception request command, the mail transmission/reception section 119 or the FAX transmission/reception section 120 extracts the E-mail text data or the FAX text data received for the mobile terminal 101 from a spool file corresponding to the "terminal identification code" transferred from the mobile terminal 101 together with the command, and transmits the E-mail text data or the FAX text data to the mobile terminal 101 through the packet transmission/reception section 115 in a way to be described later.

This TCP/IP packet is transferred to the routing section 114 in the mobile terminal control host unit 104 by the router unit 106 in the speech service provider and the relay host unit (not shown) in the Internet 105 on the basis of the "destination IP address" stored in the IP header of the IP datagram constituting the TCP/IP packet, and then transferred to the communication control section 321 (FIG. 3) in the communication section 111 of the mobile terminal 101 through the PHS network 103 (FIG. 1).

The communication control section 321 in the communication section 111 of the mobile terminal 101 identifies that the IP address (temporarily or dynamically) assigned to the mobile terminal 101, i.e., the communication control section 321 itself is set in the "destination IP address" field of the IP header of the IP datagram constituting the transferred TCP/IP packet, thereby receiving the TCP/IP packet.

The communication control section 321 confirms that the 16-bit integer value for specifying the mail reception protocol or the 16-bit value for specifying the FAX communication protocol is set in the "destination port number" field and the "transmission source port number" field of the TCP segment constituting the received TCP/IP packet, thereby notifying the CPU 316 in the control section 110 of the mobile terminal 101 of the reception.

Upon this notification, the communication control section 321 extracts the E-mail text data or the FAX text data from the "data" field of the TCP segment constituting the received TCP/IP packet and transfers the E-mail text data or the FAX text data to the CPU 316.

The CPU 316 processes the reception notification and the E-mail text data or the FAX text data in step 412 or 414 executed on the basis of determination processing in step 411 or 413 shown in FIG. 4 and displays the E-mail text data or the FAX text data on the LCD display section 311 (203 in FIG. 2).

General Operations of Mobile Terminal Communication Control Section 116, Text Speech Recognition Section 117, and Formatted Text Generation Section 118

General operations of the mobile terminal communication control section 116, the text speech recognition section 117, and the formatted text generation section 118 in the speech control host unit 108 will be described next.

The mobile terminal communication control section 116 registers an entry in a processing terminal registration table having a data structure shown in FIG. 10 in correspondence with the "terminal identification code" (the "terminal identification code" is stored in the TCP segment for transferring a command) assigned to the mobile terminal 101 which has transmitted a text speech recognition/formatting start request command. The mobile terminal communication control section 116 also generates a format type based on format type data, a buffer file (speech buffer file) for receiving speech data, a buffer file (text buffer file) for temporarily storing recognized speech text data, and a buffer file (formatted text buffer file) for transmitting formatted text data on a file system managed by the speech control host unit 108. In the processing terminal registration table shown in FIG. 10, the file names of generated files are stored in correspondence with the terminal identification code, the transmission source IP address, the format type, and the final access time. Upon successfully registering the entry and files, the mobile terminal communication control section 116 returns transmission enable data to the mobile terminal 101 corresponding to the "transmission source IP address" stored in the IP datagram which has transferred it.

Thereafter, the mobile terminal communication control section 116 additionally writes speech data received from the mobile terminal 101 in a speech buffer file specified from the entry of the processing terminal registration table corresponding to the "transmission source IP address" (the "transmission source IP address" is stored in the IP datagram which has transferred it).

If speech data has been received in the speech buffer file specified from the entry, the text speech recognition section 117 executes text speech recognition processing in units of entries of the processing terminal registration table shown in FIG. 10, and additionally writes resultant recognized speech text data in a text buffer file corresponding to the entry.

When recognized speech text data has been obtained in the text buffer file specified from the entry, the formatted text generation section 118 (FIG. 1) formats the recognized speech text data in units of entries of the processing terminal registration table shown in FIG. 10, and additionally writes the resultant formatted text data in a formatted text buffer file corresponding to the entry.

When formatted text data has been obtained in the formatted text buffer file specified from the entry, the mobile terminal communication control section 116 returns the formatted text data to the mobile terminal 101 corresponding to the "transmission source IP address" registered in the entry in units of entries of the processing terminal registration table.

The mobile terminal communication control section 116 deletes the contents of an entry of the processing terminal registration table for which a text speech recognition/formatting end request command is received, or the final access time is earlier than the current time by a predetermined time or more, and deletes buffer files specified from the entry.

Details of Operation of Mobile Terminal Communication Control Section 116

Figure 9A:
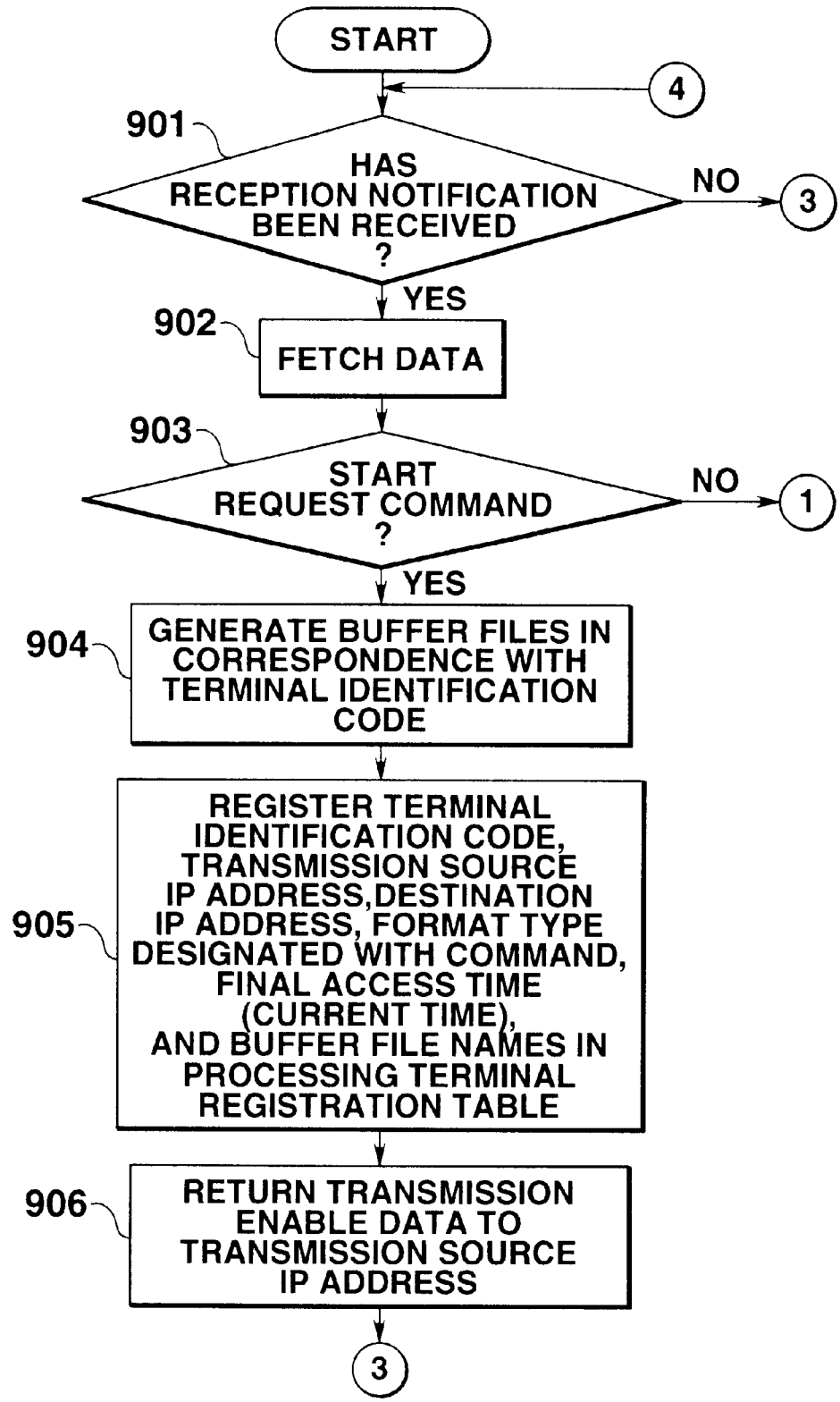
FIGS. 9A, 9B, and 9C are flow charts of the operation of a mobile terminal communication control section.
Figure 9B:
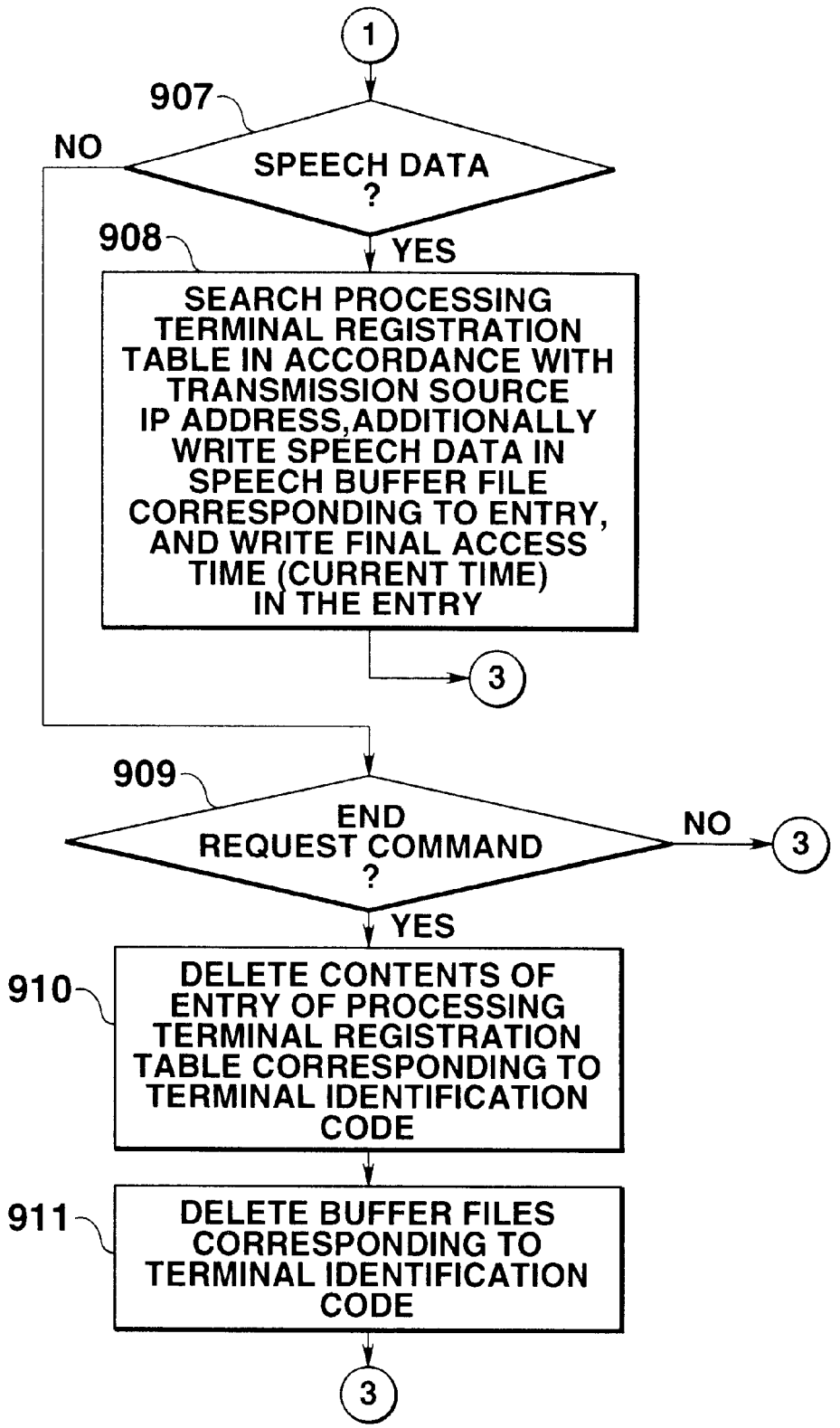
Figure 9C:
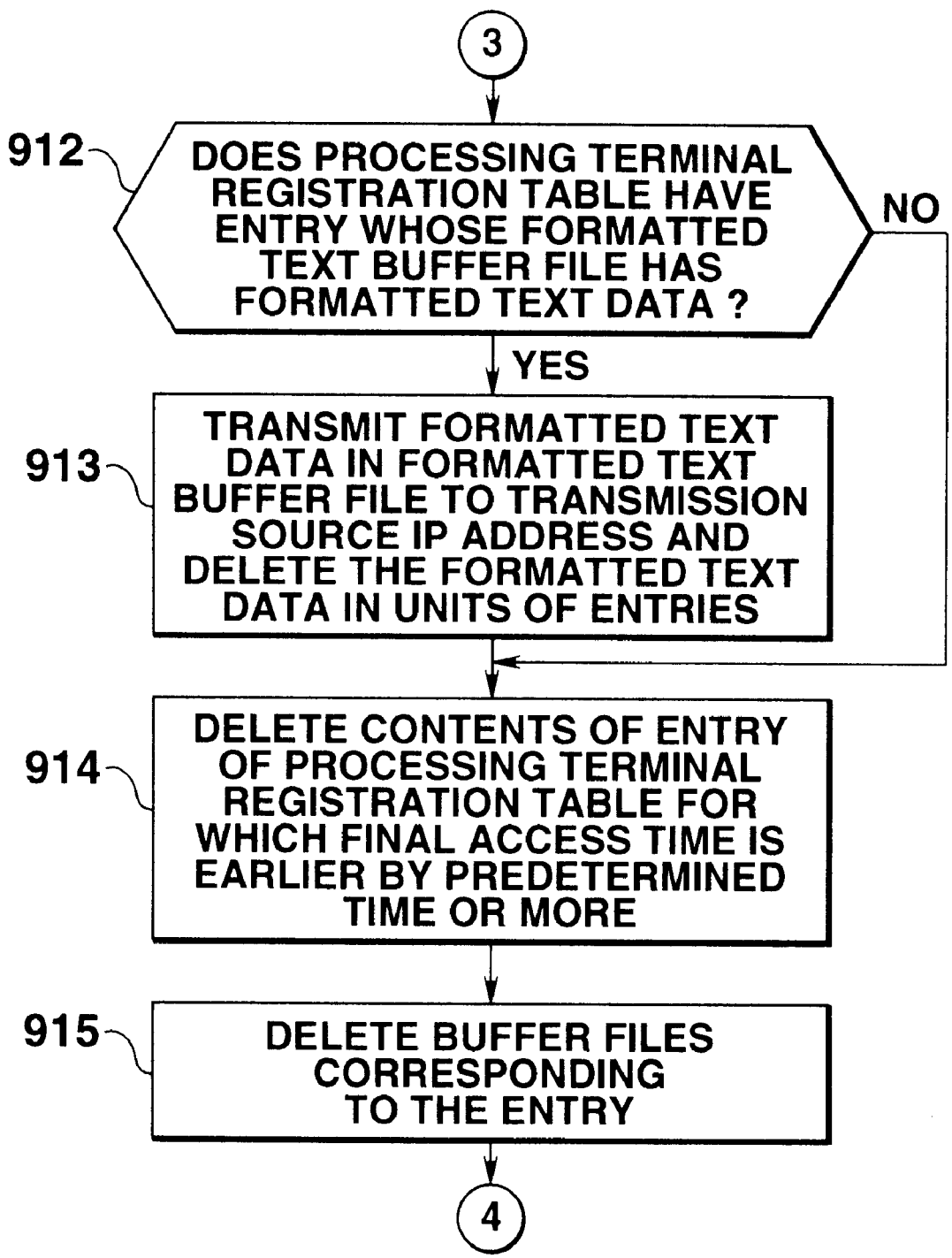

FIGS. 9A through 9C are flow charts showing the control operation executed by the mobile terminal communication control section 116 to realize the above function. The mobile terminal communication control section 116 has a processor and a control program. The operation flow is realized as an operation performed by the processor to execute the control program.

It is determined in step 901 whether the packet transmission/reception section 115 (FIG. 1) in the speech control host unit 108 has notified the mobile terminal communication control section 116 of reception. As described above, the packet transmission/reception section 115 identifies that the IP address of the speech control host unit 108, i.e., the packet transmission/reception section 115 itself is set in the "destination IP address" of the IP header of the IP datagram constituting the TCP/IP packet transferred from the Internet 105, thereby receiving the TCP/IP packet. The packet transmission/reception section 115 also confirms that the 16-bit integer value for specifying the communication protocol for text speech recognition/formatting is set in the "destination port number" field and the "transmission source port number" field of the TCP segment constituting the TCP/IP packet, thereby notifying the mobile terminal communication control section 116 of the reception. This reception of notification is associated with a text speech recognition/formatting start request command and format type data, speech data as a target of text speech recognition/formatting, or a text speech recognition/formatting end request command.

If the packet transmission/reception section 115 has notified the mobile terminal communication control section 116 of the reception, i.e., YES In step 901, data transferred from the packet transmission/reception section 115 together with the reception notification is fetched in step 902. When the reception notification is associated with a text speech recognition/formatting start request command, the "transmission source IP address", the "terminal identification code", the command, and the format type data are fetched. When the reception notification is associated with speech data, the "transmission source IP address" and the speech data are fetched. When the reception notification is associated with a text speech recognition/formatting end request command, the "terminal identification code" and the command are fetched.

After processing in step 902, step 903 in FIG. 9A and steps 907 and 909 in FIG. 9B are sequentially checked, and one determination result becomes YES. More specifically, if the data transferred from the packet transmission/reception section 115 in step 902 is associated with a text speech recognition/formatting start request command, i.e., YES in step 903, processing in steps 904 through 906 is executed. If the data is associated with speech data, i.e., YES in step 907 in FIG. 9B, processing in step 908 is executed. If the data is associated with a text speech recognition/formatting end request command, i.e., YES in step 909 in FIG. 9B, processing in steps 910 and 911 is executed.

If the packet transmission/reception section 115 has not notified the mobile terminal communication control section 116 of the reception, i.e., NO in step 901, processing corresponding to reception of the command or speech data is performed, and thereafter, formatted text data transmission processing is executed in steps 912 and 913 in FIG. 9C. Processing for ending communication with the mobile terminal 101 for which the final access time is earlier by a predetermined time or more is performed in steps 914 and 915, and the flow returns to determination processing in step 901.

Processing executed in steps 904 and 906 when YES in step 901, and the data transferred from the packet transmission/reception section 115 in step 902 is associated with a text speech recognition/formatting start request command, i.e., YES in step 903 will be described.

In step 904, a speech buffer file for receiving speech data, a text buffer file for temporarily storing recognized speech text data, and a formatted text buffer file for transmitting formatted text data are generated on the file system managed by the speech control host unit 108.

In step 905, one entry (data set of one row) is ensured on the processing terminal registration table having the data structure shown in FIG. 10, which is stored in a memory (not shown) in the mobile terminal communication control section 116. A "terminal identification code", a "transmission source IP address", a format type based on format type data, a final access time, a speech buffer file name, a text buffer file name, and a formatted text buffer file name are registered in the entry. The "terminal identification code" is data transferred from the packet transmission/reception section 115 in step 902, which has been stored in the "data" field of the TCP segment constituting the TCP/IP packet transferred from the mobile terminal 101 (FIG. 6C). The "transmission source IP address" is data transferred from the packet transmission/reception section 115 in step 902, which has been stored in the IP header of the IP datagram constituting the TCP/IP packet transferred from the mobile terminal 101 (FIGS. 6B and 7A). The current time is set in the final access time. The buffer file names represent the respective files generated in step 904.

After processing in step 905, transmission enable data is returned in step 906 to the "transmission source IP address" transferred from the packet transmission/reception section 115 in step 902 and registered in the entry of the processing terminal registration table.

More specifically, the mobile terminal communication control section 116 requests the packet transmission/reception section 115 (FIG. 1) to return transmission enable data to the "transmission source IP address".

Consequently, the packet transmission/reception section 115 generates a TCP segment having the format shown in FIG. 6C. In this case, a 16-bit integer value for specifying a communication protocol for text speech recognition/formatting is set in the "transmission source port number" field and the "destination port number" field of the TCP header having the format shown in FIGS. 6C and 7B. The transmission enable data is stored in the "data" field of the TCP segment.

Next, the packet transmission/reception section 115 generates an IP datagram having the format shown in FIG. 6B in which the TCP segment is stored in the "data" field. In this case, a 16-bit integer value for defining the format of the TCP segment data stored in the "data" field is set in the "protocol" field of the IP header having the format shown in FIGS. 6B and 7A. The IP address assigned to the speech control host unit 108 is set in the "transmission source IP address" field. The "transmission source IP address" transferred from the packet transmission/reception section 115 in step 902 of FIG. 9A is set in the "destination IP address" field.

The packet transmission/reception section 115 generates a frame according to the protocol on the LAN 107 and storing the IP datagram and sends the frame to the LAN 107. For example, if the LAN 107 is a local area network based on Ethernet, the frame is an Ethernet frame.

The TCP/IP packet constituted by the frame, the IP datagram, and the TCP segment is transferred to the mobile terminal control host unit 104 through the router unit 106 and the Internet 105 on the basis of the "destination IP address" stored in the IP header of the IP datagram constituting the TCP/IP packet, and then transferred to the communication control section 321 (FIG. 3) in the communication section 111 of the mobile terminal 101 through the PHS network 103 and the radio base station (or wire connection unit) 102.

Thereafter, speech data is transferred from the mobile terminal 101 to the speech control host unit 108, as described above.

After processing in step 906, formatted text data transmission processing is executed in steps 912 and 913 in FIG. 9C. Processing for ending communication with the mobile terminal 101 for which the final access time is earlier by a predetermined time or more is performed in steps 914 and 915, and the flow returns to determination processing in step 901 in FIG. 9A.

Processing executed in step 908 when YES in step 901 in FIG. 9A, and the data transferred from the packet transmission/reception section 115 in step 902 is speech data, i.e., YES in step 907 in FIG. 9B will be described next.

In step 908, an entry of the processing terminal registration table (FIG. 10) which stores the same "transmission source IP address" as that transferred from the packet transmission/reception section 115 in step 902 in FIG. 9A is searched for, and the speech data transferred from the packet transmission/reception section 115 in step 902 in FIG. 9A is additionally written in the speech buffer file (step 904 in FIG. 9A) corresponding to the speech buffer file name stored in the corresponding entry. The size of the speech buffer file in additional writing is automatically adjusted by the file system managed by the speech control host unit 108.

In addition, the final access time stored in the corresponding entry is updated to the current time in step 908.

In this manner, the speech data is transferred from the mobile terminal communication control section 116 to the text speech recognition section 117 (FIG. 1) through the speech buffer file for each mobile terminal 101 (for each "terminal identification code"). As will be described later, when speech data has been received in the speech buffer file specified from the entry, the text speech recognition section 117 executes text speech recognition processing for the speech data in units of entries of the processing terminal registration table, and additionally writes the resultant recognized speech text data in the text buffer file corresponding to the entry. As will be described later, when recognized speech text data has been obtained in the text buffer file specified from the entry, the formatted text generation section 118 (FIG. 1) formats the recognized speech text data in units of entries of the processing terminal registration table shown in FIG. 10, and additionally writes resultant formatted text data in the formatted text buffer file corresponding to the entry.

After processing in step 908, formatted text data transmission processing is executed in steps 912 and 913 in FIG. 9C. Processing for ending communication with the mobile terminal 101 for which the final access time is earlier by a predetermined time or more is performed in steps 914 and 915, and the flow returns to determination processing in step 901 in FIG. 9A.

Processing executed in steps 910 and 911 when YES in step 901 in FIG. 9A, and the data transferred from the packet transmission/reception section 115 in step 902 is associated with a text speech recognition/formatting end request command, i.e., YES in step 909 in FIG. 9B will be described next.

In step 910, the contents of an entry of the processing terminal registration table (FIG. 10) which stores the same "terminal identification code" as that transferred from the packet transmission/reception section 115 in step 902 in FIG. 9A are deleted.

In step 911, buffer files corresponding to the speech buffer file name, the text buffer file name, and formatted text buffer file name stored in the entry are deleted from the file system managed by the speech control host unit 108.

After processing in step 911, formatted text data transmission processing is executed in steps 912 and 913 in FIG. 9C. Processing for ending communication with the mobile terminal 101 for which the final access time is earlier by a predetermined time or more is performed in steps 914 and 915, and the flow returns to determination processing in step 901 in FIG. 9A.

Processing in steps 912 and 913 and subsequent processing in steps 914 and 915 in FIG. 9C performed when the packet transmission/reception section 115 has not notified of reception, i.e., NO in step 901 in FIG. 9A or after processing corresponding to reception of the command or speech data will be described.

In these processing operations, formatted text data obtained from the formatted text generation section 118 is transmitted.

It is determined in step 912 whether the processing terminal registration table (FIG. 10) has an entry in which formatted text data is present in a formatted text buffer file corresponding to the formatted text buffer file name.

If such an entry is not present, i.e., NO in step 912, formatted text data transmission processing in step 913 is not executed, and the flow advances to processing in steps 914 and 915.

If one or more entries as described above are present, i.e., YES in step 912, formatted text data in the formatted text buffer files corresponding to the formatted text buffer file names stored in these entries are transmitted to "transmission source IP addresses" stored in the entries in units of entries, and the transmitted formatted text data are deleted from the formatted text buffer files. The size of the formatted text buffer file in deletion is automatically adjusted by the file system managed by the speech control host unit 108.

After processing in step 913 or if NO in step 912, processing in step 914 is executed. Of entries of the processing terminal registration table (FIG. 10), an entry for which the final access time is earlier than the current time by a predetermined time or more is detected, and all the contents of the entry are deleted.

In step 915, buffer files corresponding to the speech buffer file name, the text buffer file name, and the formatted text buffer file name stored in the entry are deleted from the file system managed by the speech control host unit 108.

After processing in step 915, the flow returns to determination processing in step 901 in FIG. 9A.

Details of Operation of Text Speech Recognition Section 117

Figure 11:
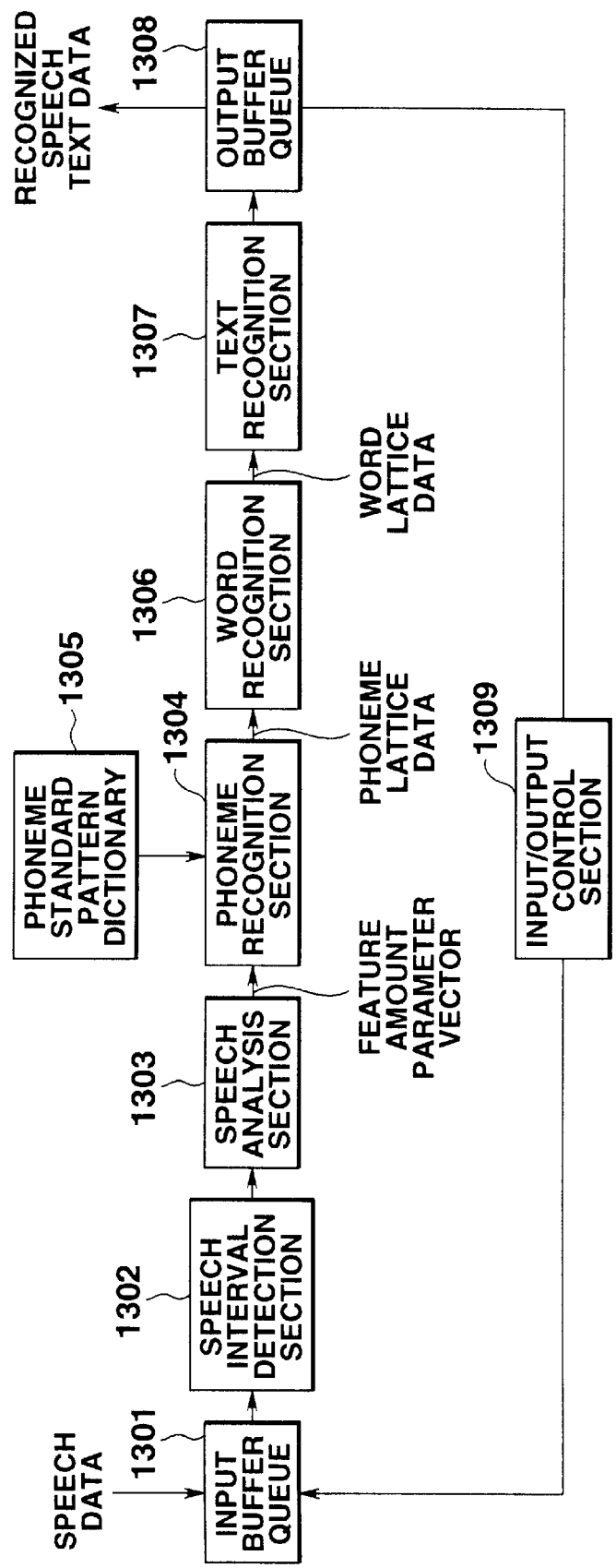
FIG. 11 is a block diagram of a text speech recognition section.

FIG. 11 is a functional block diagram of the text speech recognition section 117.

As described above, when speech data has been received in the speech buffer file specified from the entry, the text speech recognition section 117 executes text speech recognition for the speech data in units of entries of the processing terminal registration table shown in FIG. 10, and additionally writes resultant recognized speech text data in the text buffer file corresponding to the entry.

Figure 12:
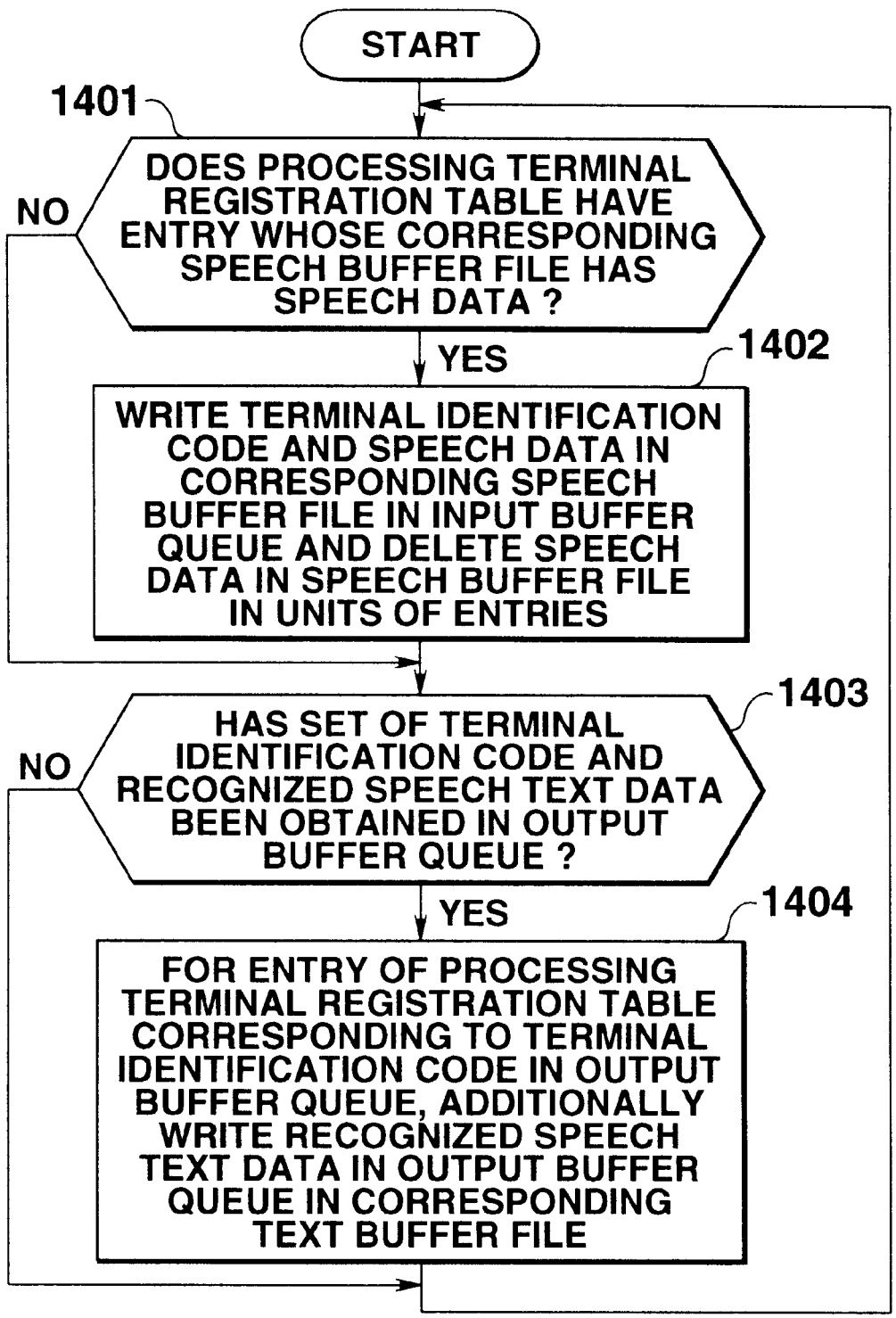
FIG. 12 is a flow chart of the operation of an input/output control section in the speech recognition section.

Reading of speech data from the speech buffer file and writing of recognized speech text data in the text buffer file in units of entries are controlled by an input/output control section 1309 shown in FIG. 11. The control operation of the input/output control section 1309 will be described first. FIG. 12 is a flow chart showing the control operation executed by the input/output control section 1309. The input/output control section 1309 has a processor and a control program, and the operation flow is realized as an operation performed by the processor to execute the control program.

It is determined in step 1401 whether the processing terminal registration table (FIG. 10) has an entry in which speech data is stored in the speech buffer file corresponding to the speech buffer file name.

If such an entry is present, i.e., YES in step 1401, the "terminal identification code" stored in the entry and the speech data corresponding to the speech buffer file name stored in the entry are written in an input buffer queue 1301 shown in FIG. 11 in units of entries, and the speech data is deleted from the speech buffer file in step 1402.

The input buffer queue 1301 has a function of sequentially supplying speech data which is being queued by the input buffer queue 1301 to a speech interval detection section 1302. A speech analysis section 1303, a phoneme recognition section 1304, a word recognition section 1306, and a text recognition section 1307 connected to the output of the speech interval detection section 1302 form a data processing pipeline and have a function of independently processing input data. The sections 1302 through 1307 can recognize the "terminal identification code" (the "terminal identification code" is input from the input buffer queue 1301) corresponding to the speech data which is currently being processed. Finally, a set of the "terminal identification code" and recognized speech text data is output from the text recognition section 1307 to an output buffer queue 1308.

After processing in step 1402 or if NO in step 1401, it is determined in step 1403 whether the output buffer queue 1308 shown in FIG. 11 has obtained the set of the "terminal identification code" and the recognized speech text data.

If such a set has been obtained, i.e., YES in step 1403, the recognized speech text data of the set in the output buffer queue 1308 is additionally written in the text buffer file corresponding to the text buffer file name stored in the entry of the processing terminal registration table, which corresponds to the "terminal identification code", in units of sets in the output buffer queue 1308 in step 1404.

After processing in step 1404, or if NO in step 1403, determination processing in step 1401 is executed again.

In the above-described way, the text speech recognition section 117 can efficiently execute text speech recognition processing for the speech data, which is requested from a plurality of mobile terminals 101, as an assembly line operation.

The functions of the sections 1302 through 1307 for realizing text speech recognition processing will be described below. Each scheme to be described below can be realized by referring to, e.g., Furui, "Introduction to Electronics/information Engineering 2, Acoustic/phonetic Engineering", Chapter 14, Kindaikagaku-sha.

The speech interval detection section 1302 detects the interval where speech data is present from the sample time series of speech data input from the input buffer queue 1301. More specifically, the speech interval detection section 1302 calculates the average power of predetermined samples (e.g., 32 to 256 samples of 8-kHz sampling data) and detects, as a speech interval, an interval where a state wherein the average power exceeds a predetermined threshold value continues a predetermined number of cycles or more. With this processing, erroneous recognition of text speech data in an interval where no speech data is present can be prevented.

The speech analysis section 1303 analyzes the characteristic feature of the speech data output from the speech interval detection section 1302, thereby detecting a feature amount parameter vector. One of the following known analysis methods can be employed as a speech analysis method.

(1) Each output from a band filter bank for receiving the speech data time series is smoothed, and each smoothed output is used as an element of the feature amount parameter vector.

(2) Each short-time spectral component calculated by fast Fourier transform (FFT) is smoothed while receiving the speech data time series of predetermined continuous samples, and each smoothed component value is used as an element of the feature amount parameter vector.

(3) A cepstrum coefficient group is calculated using cepstrum analysis while receiving the speech data time series of predetermined continuous samples, and the cepstrum coefficient group is used as an element of the feature amount parameter vector.

(4) Not only the cepstrum coefficient group in (3) but also a Δ cepstrum (cepstrum differential coefficient) group for the cepstrum coefficient group is calculated and added as an element of the feature amount parameter vector.

(5) An LPC (LSP) coefficient group is calculated by linear prediction analysis (LPC analysis, and more specifically, a line spectrum pair analysis: LSP analysis) while receiving the speech data time series of predetermined continuous samples and used as an element of the feature amount parameter vector.

(6) An autocorrelation function is calculated by autocorrelation analysis while receiving the speech data time series of predetermined continuous samples, and a speech pitch fundamental frequency pattern detected on the basis of the autocorrelation function is added as an element of the feature amount parameter vector.

The phoneme recognition section 1304 calculates the similarity (distance) between the feature amount parameter vector output from the speech analysis section 1303 at a predetermined frame period (in units of predetermined samples) and the standard pattern of the feature amount parameter vector of each phoneme stored in the phoneme standard pattern dictionary 1303, and outputs, as phoneme lattice data, a set of phonemes having high similarities obtained at a predetermined frame period together with the similarities. To prevent erroneous phoneme recognition, the phoneme recognition section 1304 outputs the resultant data in the form of phoneme lattice data in which phoneme candidates are listed in a table instead of determining a final phoneme at a predetermined frame period.

The word recognition section 1306 receives the phoneme lattice data output from the phoneme recognition section 1304 at a predetermined frame period and outputs word lattice data in which word candidates are listed in a table at a predetermined frame period. One of the following known analysis methods can be employed as a word recognition method.

(1) The word recognition section 1306 executes time normalization (DP matching or DTW: Dynamic Time Warping) for a phoneme lattice data time series across a plurality of frame periods, which is output from the phoneme recognition section 1304, and the total phoneme standard pattern series stored in the word dictionary, and outputs word lattice data. In this case as well, to prevent erroneous word recognition, the word recognition section 1306 outputs the resultant data in the form of word lattice data in which word candidates are listed in a table instead of determining a final word at a predetermined frame period.

(2) The word recognition section 1306 models all words using HMM (Hidden Markov Model), inputs a phoneme lattice data time series across a plurality of frame periods, which is output from the phoneme recognition section 1304, to an HMM analysis section, and outputs words corresponding to a plurality of models as word lattice data containing word candidates in a descending order of the frequency of occurrence.

Finally, as the first-stage processing, the text recognition section 1307 sequentially inputs word lattice data output from the word recognition section 1306 and calculates various clause likelihoods as clause lattice data in accordance with an intraclause grammar (word order rule) associated with the clause a structure of Japanese (or English). As the second-stage processing, the text recognition section 1307 analyzes the semantic modification between clauses in accordance with the intraclause grammar, determines recognized speech text data, and writes the recognized speech text data in the output buffer queue 1308 to be paired with the "terminal identification code" sequentially transmitted from the input buffer queue 1301.

Details of Operation of Formatted Text Generation Section 118

Figure 13:
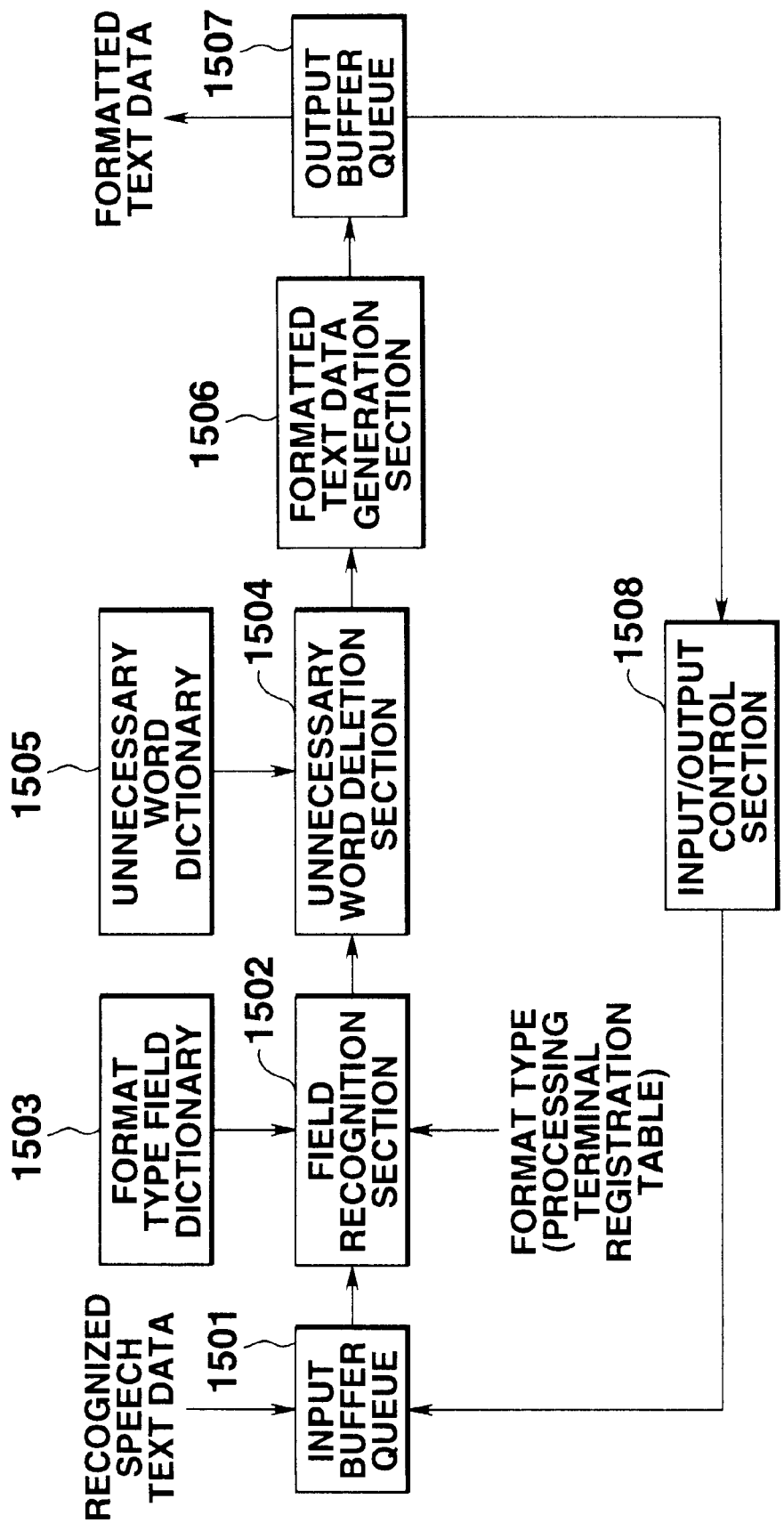
FIG. 13 is a flow chart of the operation of a formatted text generation section.

FIG. 13 is a functional block diagram of the formatted text generation section 118.

As described above, when recognized speech text data has been received, from the text speech recognition section 117, in the text buffer file specified from an entry, the formatted text generation section 118 formats the recognized speech text data in units of entries of the processing terminal registration table shown in FIG. 10, and additionally writes resultant formatted text data in the formatted text buffer file corresponding to the entry.

Figure 14:
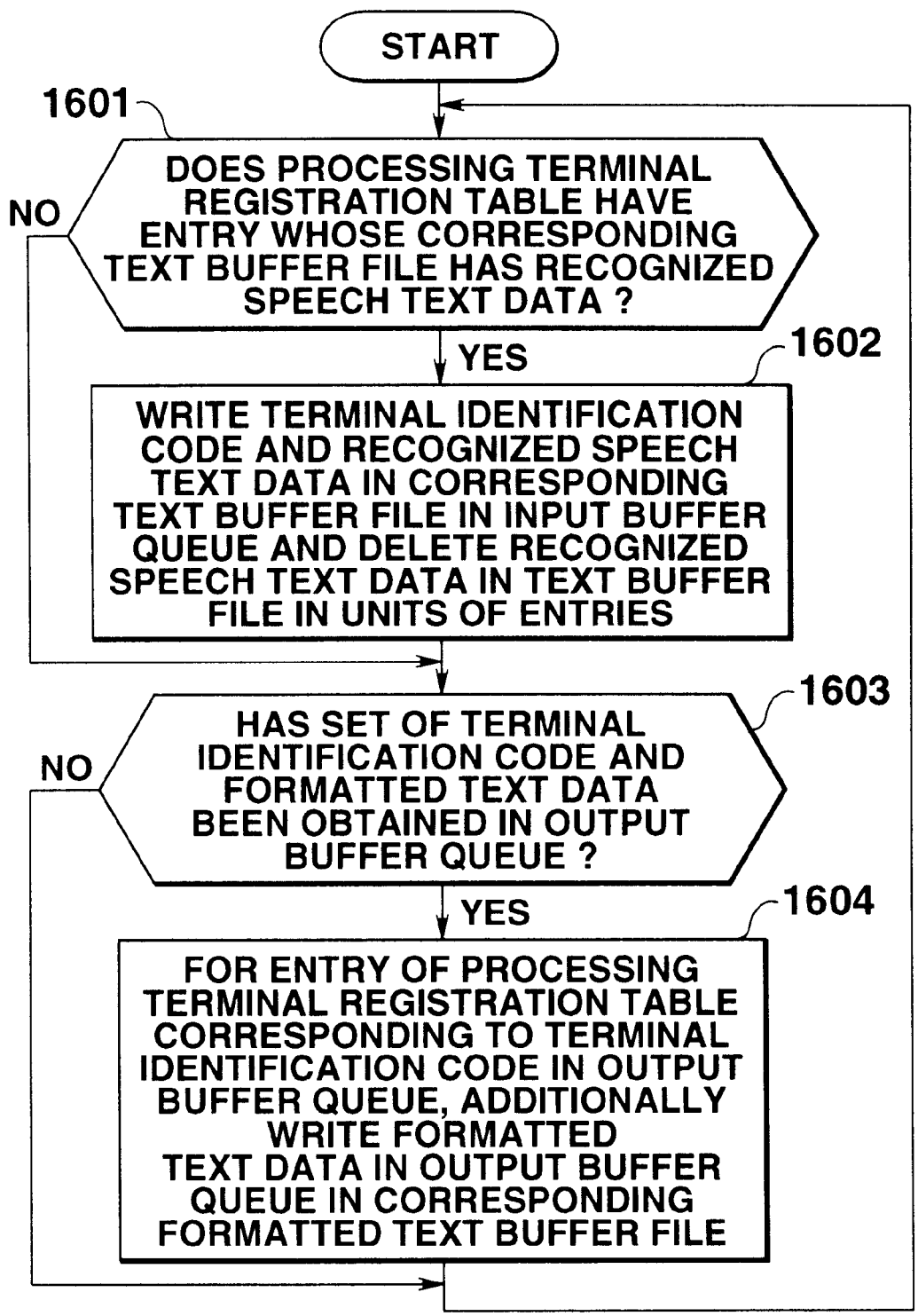
FIG. 14 is a flow chart of the operation of an input/output control section in the formatted text generation section.

Reading of recognized speech text data from the text buffer file and writing of formatted text data in the formatted text buffer file in units of entries are controlled by an input/output control section 1508 shown in FIG. 13. The control operation of the input/output control section 1508 will be described first. FIG. 14 is a flow chart showing the control operation executed by the input/output control section 1508. The input/output control section 1508 has a processor and a control program, and the flow is realized as an operation performed by the processor to execute the control program. The same control operation as that of the input/output control section 1309 in the text speech recognition section 117, which is shown in FIG. 11, is realized.

It is determined in step 1601 whether the processing terminal registration table (FIG. 10) has an entry in which recognized speech text data is stored in the text buffer file corresponding to the text buffer file name.

If such an entry is present, i.e., YES in step 1601, the "terminal identification code" stored in the entry and recognized speech text data on the text buffer file corresponding to the text buffer file name stored in the entry are written in an input buffer queue 1501 shown in FIG. 13 in units of entries, and the recognized speech text data is deleted from the text buffer file in step 1602.

The input buffer queue 1501 has a function of sequentially supplying recognized speech text data which is being queued by the input buffer queue 1501 to a field recognition section 1502. An unnecessary word deletion section 1504 and a formatted text data generation section 1506 connected to the output of the field recognition section 1502 form a data processing pipeline, as in the text speech recognition section 117 shown in FIG. 11, and have a function of independently processing input data. The sections 1502 through 1506 can recognize the "terminal identification code" (the "terminal identification code" is input from the input buffer queue 1501) corresponding to the recognized speech text data which is currently being processed. Finally, a set of the "terminal identification code" and formatted text data is output from the formatted text data generation section 1506 to an output buffer queue 1507.

After processing in step 1602 or if NO in step 1601, it is determined in step 1603 whether the output buffer queue 1507 shown in FIG. 13 has obtained the set of the "terminal identification code" and the formatted text data.

If such a set has been obtained, i.e., YES in step 1603, the formatted text data of the set in the output buffer queue 1507 is additionally written in the formatted text buffer file corresponding to the formatted text buffer file name stored in the entry of the processing terminal registration table, which corresponds to the "terminal identification code", in units of sets in the output buffer queue 1507 in step 1604.

After processing in step 1604, or if NO in step 1603, determination processing in step 1601 is executed again.

In the above-described way, like the text speech recognition section 117, the formatted text generation section 118 can efficiently format the recognized speech text data obtained by the text speech recognition section 117 on the basis of a request from a plurality of mobile terminals 101, as an assembly line operation.

The functions of the sections 1502 through 1505 for realizing formatting will be described below.

The field recognition section 1502 determines the format type stored in the entry of the processing terminal registration table in correspondence with the "terminal identification code" of the set for each set of the "terminal identification code" and the recognized speech text data sequentially input from the input buffer queue 1501, determines the field of the recognized speech text data of the set with reference to a format type field dictionary 1503, and outputs a set of field information, the "terminal identification code", and the recognized speech text data to the unnecessary word deletion section 1504.

More specifically, the format type field dictionary 1503 stores a field name and a keyword corresponding to the field name in units of format types. The field recognition section 1502 designates a searching range to be referred to on the format type field dictionary 1503 in accordance with the format type obtained from the processing terminal registration table, searches for a field name for which a word contained in the recognized speech text data is registered as a keyword, and determines it as the field of the recognized speech text data.

When the user of the mobile terminal 101 is to generate an E-mail, the user designates "E-mail" as format type data together with a text speech recognition/formatting start request command. Thereafter, the user sequentially pronounces, e.g., "the destination is taro@casio.co.jp", "the carbon copy is hanako@osuga.co.jp", or "the text is . . . " These pronounced contents are recognized as recognized speech text data by the text speech recognition section 117 in the speech control host unit 108. To generate FAX data, the user sequentially pronounces, e.g., "the destination number is 0425-79-7735, or "the text is . . . "

Upon receiving, e.g., recognized speech text data "the destination is taro@casio.co.jp", the formatted text generation section 118 designates a searching range corresponding to the "E-mail" format on the format type field dictionary 1503 in accordance with format type data "E-mail". The formatted text generation section 118 searches for a field name "destination" for which a word "destination" contained in the recognized speech text data is registered as a keyword from the searching range, and determines it as the field of the recognized speech text data. Not only the keyword "destination (a Chinese character)" but also "destination (the cursive kana letters)", "destination address (a Chinese character+the Japanese syllabary)", "destination address (the cursive letters+the Japanese syllabary)", "partner (a Chinese character)", "destination (the cursive kana letters)", "partner address (a Chinese character+the Japanese syllabary)", "partner address (the cursive letters+the Japanese syllabary)" and the like are registered as keywords for the field name "destination" in the searching range of the format type field dictionary 1503. This arrangement can cope with various schema designated by the user for the "destination" field.

This also applies to a case wherein the recognized speech text data is "the carbon copy is hanako@osuga.co.jp", "the text is . . . ", or "the destination number is 0425-79-7735".

The same processing can be performed even when the format type is "address book", "schedule book", or "memo pad". For example, a keyword "address", "name", or "telephone number" is searched for from recognized speech text data.

The unnecessary word deletion section 1504 refers to the unnecessary word dictionary 1505 for the set of the field information, the "terminal identification code", and the recognized speech text data output from the field recognition section 1502, thereby deleting unnecessary words "is" and the like. The resultant recognized speech text data is output to the formatted text data generation section 1506 together with the field information and the "terminal identification code".

Consequently, the formatted text data generation section 1506 generates formatted text data on the basis of the received field information and recognized speech text data, and writes the formatted text data in the output buffer queue 1507 together with the received "terminal identification code". For example, when the format type is "E-mail", the field recognition section 1502 detects "destination" from the recognized speech text data "the destination is taro@casio.co.jp", the unnecessary word deletion section 1504 deletes unnecessary words, and it is determined that a field corresponding to the "destination" field is "taro@casio.co.jp". With this processing, a field such as "To: taro@casio.co.jp", "Cc: hanako@osuga.co.jp", or "text: . . . " is generated. When the format type is "FAX", a field such as "destination number: 0425-79-7735, or "text: . . . " is generated. When the format type is "address book", "schedule book", or "memo pad", a field such as "address: Shinjuku-ku Tokyo", "name: Yamada . . . " or "telephone: 03-123-4567" is generated. The generated field is inserted into a predetermined field of a predetermined text format such as "E-mail", "FAX", "address book", "schedule book", or "memo pad" to generate formatted text data.

Operation of Mail Transmission/Reception Section 119

Figure 15:
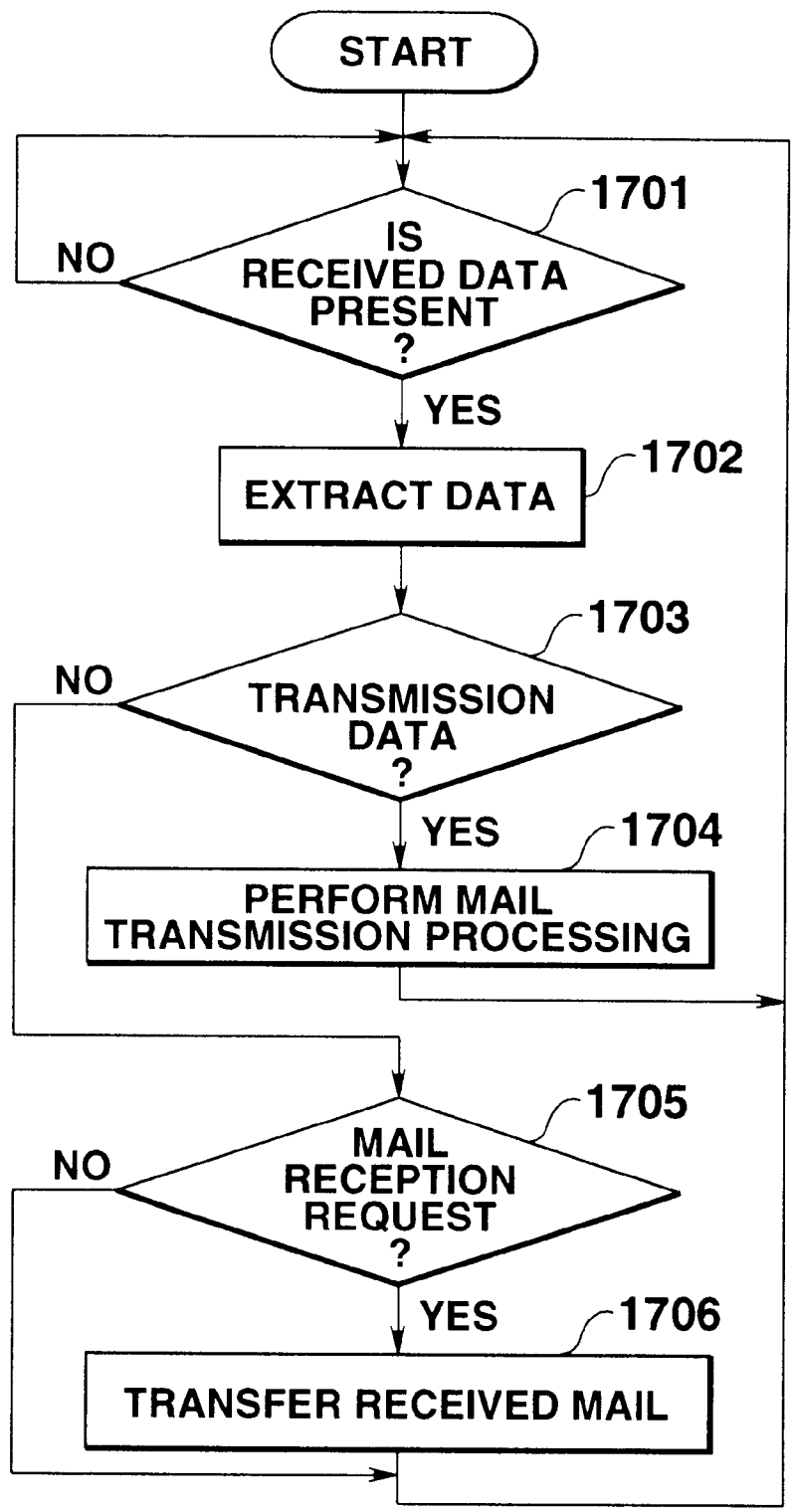
FIG. 15 is a flow chart of the operation of a mail transmission/reception section.

FIG. 15 is a flow chart of the control operation executed by the mail transmission/reception section 119 in the speech control host unit 108. This flow chart is realized as an operation performed by a processor for controlling the mail transmission/reception section 119 (not shown) to execute a control program (not shown).

It is determined in step 1701 whether the packet transmission/reception section 115 (FIG. 1) in the speech control host unit 108 has notified the mail transmission/reception section 119 of reception. As described above, the packet transmission/reception section 115 identifies that the IP address of the speech control host unit 108, i.e., the packet transmission/reception section 115 itself is set in the "destination IP address" field of the IP header of the IP datagram constituting the TCP/IP packet transferred from the Internet 105, thereby receiving the TCP/IP packet. The packet transmission/reception section 115 also confirms that the 16-bit integer value for specifying the mail transmission protocol or mail reception protocol is set in the "destination port number" field and the "transmission source port number" field of the TCP segment constituting the TCP/IP packet, thereby notifying the mail transmission/reception section 119 of the reception. This reception notification is associated with E-mail text data to be transmitted or a mail reception request command for a reception request.

If the packet transmission/reception section 115 has notified the mail transmission/reception section 119 of reception, i.e., YES in step 1701, data transferred from the packet transmission/reception section 115 together with the reception notification are fetched in step 1702. When the reception notification is associated with E-mail text data to be transmitted, the "transmission source IP address" and the E-mail text data are fetched. When the reception notification is associated with a mail reception request command, the "transmission source IP address", the "terminal identification code", and the command are fetched.

After processing in step 1702, steps 1703 and 1705 are sequentially checked, and one determination result becomes YES. More specifically, if the data transferred from the packet transmission/reception section 115 in step 1702 is associated with E-mail text data to be transmitted, i.e., YES in step 1703, mail transmission processing in step 1704 is executed. If the data is associated with a mail reception request command, i.e., YES in step 1705, received mail transfer processing in step 1706 is executed.

If the packet transmission/reception section 115 has not notified the mail transmission/reception section 119 of reception, i.e., NO in step 1701, a wait state is set.

Transmission processing in step 1704 performed when YES in step 1701, and data transferred from the packet transmission/reception section 115 in step 1702 is associated with E-mail text data to be transmitted, i.e., YES in step 1703 will be described.

In step 1704, the mail transmission/reception section 119 inquires of a name solution server (host unit) (not shown) on the speech control host unit 108, the LAN 107, or the Internet 105 through the packet transmission/reception section 115 to convert the E-mail address set in the "To field" and "Cc field" of the E-mail text data fetched from the mobile terminal 101 through the packet transmission/reception section 115 into an IP address, and thereafter, requests the packet transmission/reception section 115 to transmit the E-mail text data to the IP address.

The packet transmission/reception section 115 generates a TCP segment having the format shown in FIG. 6C. In this case, a 16-bit integer value for specifying a mail transmission protocol (e.g., SMTP) is set in the "transmission source port number" field and the "destination port number" field of the TCP header having the format shown in FIGS. 6C and 7B. A mail transmission command based on the mail transmission command and/or E-mail text data are stored in the "data" field of the TCP segment.

Next, the packet transmission/reception section 115 generates an IP datagram having the format shown in FIG. 6B in which the TCP segment is stored in the "data" field. In this case, a 16-bit integer value for defining the format of the TCP segment data stored in the "data" field is set in the "protocol" field of the IP header having the format shown in FIGS. 6B and 7A. An IP address assigned to the speech control host unit 108 is set in the "transmission source IP address" field. An IP address corresponding to the "To field" and "Cc field" of the E-mail text data is set in the "destination IP address" field. When a plurality of "destination IP addresses" are present, a plurality of TCP/IP packets are copied and transmitted.

The packet transmission/reception section 115 generates a frame according to the protocol on the LAN 107 and storing the IP datagram and sends the frame to the LAN 107. For example, if the LAN 107 is a local area network based on Ethernet, the frame is an Ethernet frame.

The TCP/IP packet constituted by the frame, the IP datagram, and the TCP segment is transferred to the destination host unit on the basis of the "destination IP address" stored in the IP header of the IP datagram constituting the TCP/IP packet.

Received mail transfer processing executed in step 1706 when YES in step 1701, and the data transferred from the packet transmission/reception section 115 in step 1702 is associated with a mail reception request command, i.e., YES in step 1705 will be described next.

In step 1706, the mail transmission/reception section 119 requests the packet transmission/reception section 115 to extract E-mail text data which has been received for the mobile terminal 101 from a spool file corresponding to the "terminal identification code" fetched from the packet transmission/reception section 115 in step 1702 and transmit the E-mail text data to the mobile terminal 101.

The packet transmission/reception section 115 generates a TCP segment having the format shown in FIG. 6C. In this case, a 16-bit integer value for specifying a mail reception protocol (e.g., POP3) is set in the "transmission source port number" field and the "destination port number" field of the TCP header having the format shown in FIGS. 6C and 7B. The E-mail text data extracted from the spool is stored in the "data" field of the TCP segment. Whether the contents of the spool are to be deleted is determined by user setting from the mobile terminal 101.

The packet transmission/reception section 115 generates an IP datagram having the format shown in FIG. 6B in which the TCP segment is stored in the "data" field. In this case, an integer value of "6" for defining the format of the TCP segment data to be stored in the "data" field is set in the "protocol" field of the IP header having the format shown in FIGS. 6B and 7A. An IP address assigned to the speech control host unit 108 is set in the "transmission source IP address" field. A "transmission source IP address" fetched from the packet transmission/reception section 115 in step 1702 is set in the "destination IP address" field. This "transmission source IP address" is an address set in the TCP/IP packet which stores the mail reception request command and corresponding to the mobile terminal 101 which has transmitted the command.

The packet transmission/reception section 115 generates a frame according to the protocol on the LAN 107 and storing the IP datagram and sends the frame to the LAN 107. For example, if the LAN 107 is a local area network based on Ethernet, the frame is an Ethernet frame.

The TCP/IP packet constituted by the frame, the IP datagram, and the TCP segment is transferred to the mobile terminal control host unit 104 through the router unit 106 and the Internet 105 on the basis of the "destination IP address" stored in the IP header of the IP datagram constituting the TCP/IP packet, and then transferred to the communication control section 321 (FIG. 3) in the communication section 111 of the mobile terminal 101 through the PHS network 103 and the radio base station (or a wire connection unit) 102.

Operation of FAX Transmission/Reception Section 120

Figure 16:
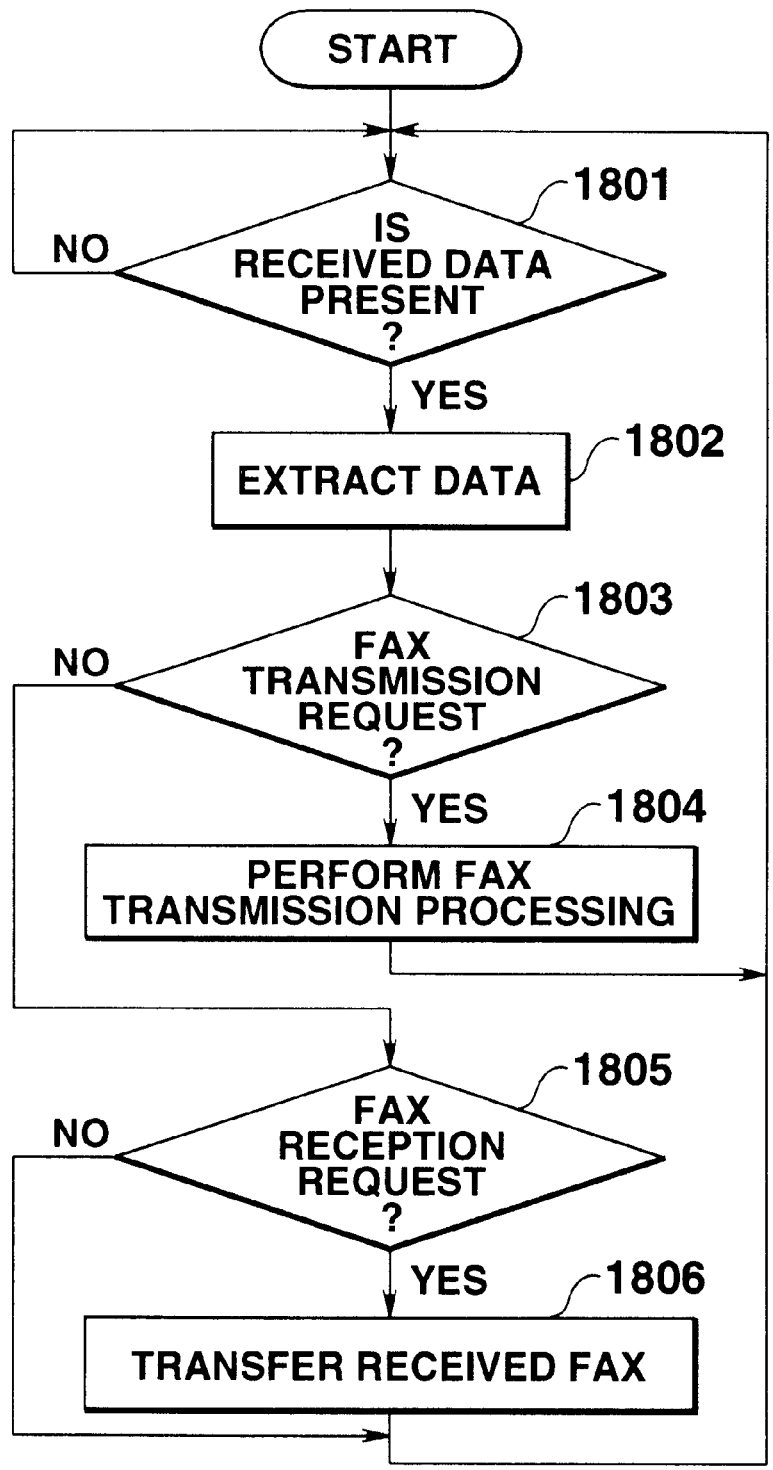
FIG. 16 is a flow chart of the operation of a FAX transmission/reception section.

FIG. 16 is a flow chart showing the control operation executed by the FAX transmission/reception section 120 in the speech control host unit 108. This flow chart is realized as an operation performed by a processor (not shown) for controlling the FAX transmission/reception section 120 to execute a control program (not shown). This flow chart has the same function as that of the flow chart corresponding to the mail transmission/reception section 119 shown in FIG. 15 except in that not the Internet 105 but the telephone line 121 (FIG. 1) is used as a FAX text data transfer medium.

It is determined in step 1801 whether the packet transmission/reception section 115 (FIG. 1) in the speech control host unit 108 has notified the FAX transmission/reception section 120 of reception. As described above, the packet transmission/reception section 115 identifies that the IP address of the speech control host unit 108, i.e., the packet transmission/reception section 115 itself is set in the "destination IP address" field of the IP header of the IP datagram constituting the TCP/IP packet transferred from the Internet 105, thereby receiving the TCP/IP packet. The packet transmission/reception section 115 also confirms that the 16-bit integer value for specifying the FAX communication protocol is set in the "destination port number" field and the "transmission source port number" field of the TCP segment constituting the TCP/IP packet, thereby notifying the FAX transmission/reception section 120 of reception. This reception notification is associated with FAX text data to be transmitted, or a FAX reception request command for a reception request.

If the packet transmission/reception section 115 has notified the FAX transmission/reception section 120 of reception, i.e., YES in step 1801, data transferred from the packet transmission/reception section 115 together with the reception notification is fetched in step 1802. When the reception notification is associated with FAX text data to be transmitted, the "transmission source IP address" and the FAX text data are fetched. When the reception notification is associated with a FAX reception request command, the "transmission source IP address", the "terminal identification code", and the command are fetched.

After processing in step 1802, steps 1803 and 1805 are sequentially checked, and one determination result becomes YES. More specifically, if the data A transferred from the packet transmission/reception section 115 in step 1802 is associated with FAX text data to be transmitted, i.e., YES in step 1803, mail transmission processing in step 1804 is executed. If the data is associated with a FAX reception request command, i.e., YES in step 1805, received mail transfer processing in step 1806 is executed.

If the packet transmission/reception section 115 has not notified the FAX transmission/reception section 120 of reception, i.e., NO in step 1801, a wait state is set.

Transmission processing in step 1804 which is performed when YES in step 1801, and data transferred from the packet transmission/reception section 115 in step 1802 is associated with FAX text data to be transmitted, i.e., YES in step 1803 will be described.

In step 1804, the FAX transmission/reception section 120 dials, on the telephone line 121 (FIG. 1), the destination number set in the "destination number" field of the FAX text data fetched from the mobile terminal 101 through the packet transmission/reception section 115, thereby transmitting the FAX text data to the partner FAX apparaWhen a re the call has terminated. When a plurality of destination numbers are set in the destination number field, a plurality of FAX text data are copied and transmitted to the FAX apparatuses corresponding to the respective destination numbers.

Received mail transfer processing executed in step 1806 when YES in step 1801, and the data transferred from the packet transmission/reception section 115 in step 1802 is associated with a FAX reception request command, i.e., YES in step 1805 will be described next.

In step 1806, the FAX transmission/reception section 120 requests the packet transmission/reception section 115 to extract FAX text data which has been received for the mobile terminal 101 from a spool file corresponding to the "terminal identification code" fetched from the packet transmission/reception section 115 in step 1802 and transmit the FAX text data to the mobile terminal 101.

The packet transmission/reception section 115 generates a TCP segment having the format shown in FIG. 6C. In this case, a 16-bit integer value for specifying the FAX communication protocol is set in the "transmission source port number" field and the "destination port number" field of the TCP header having the format shown in FIGS. 6C and 7B. The FAX text data extracted from the spool is stored in the "data" field of the TCP segment. Whether the contents of the spool are to be deleted is determined by user setting from the mobile terminal 101.

Next, the packet transmission/reception section 115 generates an IP datagram having the format shown in FIG. 6B in which the TCP segment is stored in the "data" field. In this case, an integer value of "6" for defining the format of the TCP segment data to be stored in the "data" field is set in the "protocol" field of the IP header having the format shown in FIGS. 6B and 7A. An IP address assigned to the speech control host unit 108 is set in the "transmission source IP address" field. A "transmission source IP address" fetched from the packet transmission/reception section 115 in step 1802 is set in the "destination IP address" field. This "transmission source IP address" is an address set in the TCP/IP packet which stores the mail reception request command and corresponding to the mobile terminal 101 which has transmitted the command.

The packet transmission/reception section 115 generates a frame according to the protocol on the LAN 107 and storing the IP datagram and sends the frame to the LAN 107. For example, if the LAN 107 is a local area network based on Ethernet, the frame is an Ethernet frame.

The TCP/IP packet constituted by the frame, the IP datagram, and the TCP segment is transferred to the mobile terminal control host unit 104 through the router unit 106 and the Internet 105 on the basis of the "destination IP address" stored in the IP header of the IP datagram constituting the TCP/IP packet, and then transferred to the communication control section 321 (FIG. 3) in the communication section 111 of the mobile terminal 101 through the PHS network 103 and the radio base station (or a wire connection unit) 102.

In case of "address book", "schedule book", or "memo pad", generated formatted text data is transmitted to the mobile terminal 101.

Other Embodiments

In the above-described embodiments, the mobile terminal 101 is a PHS terminal, and the mobile terminal 101 and the speech control host unit 108 are connected through the PHS network 103 and the Internet 105. However, the present invention is not limited to this embodiment. As far as the mobile terminal 101 is indirectly or directly connected to the speech control host unit 108 by radio or wire, the present invention can be applied.

In inputting, e.g., an E-mail address or a FAX destination number, an address database may be formed in the formatted text generation section 118 of the speech control host unit 108 in advance. When a name or the like is pronounced on the mobile terminal 101 side, the name or the like may be confirmed, and the address database may be referred to, thereby converting the name or the like into an E-mail address or a FAX destination number and generating E-mail text data or FAX text data.

In the above embodiment, E-mail text data or FAX text data generated by the speech control host unit 108 is transmitted to the mobile terminal 101, edited on the mobile terminal 101 side, and transmitted to the mail or FAX destination. However, the E-mail text data or FAX text data may be transmitted to the mail or FAX destination immediately after it is generated by the speech control host unit 108.

In the above embodiment, the speech control host unit 108 generates formatted text data. However, a keyword may be searched for at least from recognized speech text data and transmitted to the mobile terminal 101.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

I claim:

1. A speech control apparatus connected to a terminal through a communication network, comprising:

means for receiving speech data transmitted from said terminal;

processing means for recognizing the received speech data, converting the recognized speech data into document data, extracting a specific word from the converted document data, and generating formatted document data having a predetermined format by inserting the extracted word into a specified field of the converted document data; and transmitting means for transmitting the generated formatted document data through said communication network.

2. An apparatus according to claim 1, wherein said processing means comprises means for extracting a word associated with a destination from the converted document data and inserting the extracted word into a field designating a destination of the formatted document data.

3. An apparatus according to claim 2, wherein said processing means specifies an E-mail destination as the destination and generates formatted E-mail text data as the formatted document data, and wherein the transmitting means transmits the formatted E-mail text data to the specified destination.

4. An apparatus according to claim 2, wherein said processing means specifies a FAX destination as the destination and generates formatted FAX text data as the formatted document data, and wherein the transmitting means transmits the formatted FAX text data to the specified destination.

5. An apparatus according to claim 2, wherein said terminal comprises means for receiving the formatted document data generated by said apparatus, means for editing the formatted document data, and means for transmitting the formatted document data to the destination.

6. An apparatus according to claim 1, wherein said terminal comprises means for designating a type of formatted document data, and said apparatus receives data representing the designated type, and extracts a word corresponding to the formatted document data of the designated type, thereby generating the formatted document data.

7. A speech control apparatus connected to a terminal through a communication network, comprising:

means for receiving speech data transmitted from said terminal;

means for recognizing the received speech data and converting the speech data into document data;

means for extracting a word relating to a destination from the converted document data to specify a destination; and means for transmitting the converted document data to the specified destination.

8. An apparatus according to claim 7, further comprising an address database storing a correspondence between names and destinations, and wherein said means for extracting the word relating to the destination from the converted document data to specify the destination refers to the address database and specifies the destination from a name extracted as the word.

9. A portable terminal unit for obtaining text data from speech data through a network, comprising:

means for inputting speech data;

transmit control means for appending an identification code of the portable terminal unit to the input speech data and for transmitting the speech data to a speech control unit connected to the portable terminal unit through the network;

receive control means for receiving text data as a result of conversion of the speech data transmitted from the speech control unit to the portable terminal unit corresponding to the identification code; and display means for displaying the received text data.

10. A speech control apparatus to which a plurality of terminal units are connected through a network, comprising:

means for receiving speech data and data identifying a format type transmitted from each of the terminal units;

document generating means for recognizing the received speech data, converting the recognized speech data into document data, and generating formatted document data having a format corresponding to the format type for each terminal unit; and means for transmitting the generated formatted document data to the specified terminal unit through the network.

11. An article of manufacture comprising a computer usable medium having computer readable program code means embodied therein for causing speech data to be converted into formatted document data in a speech control apparatus to which a terminal unit is connected through a network, the computer readable program code means comprising:

means for causing a computer to receive speech data transmitted from the terminal unit;

means for causing the computer to recognize the received speech data, convert the recognized speech data into document data, extract a specific word from the converted document data, and insert the extracted word into a specific field of the converted document data to generate formatted document data having a predetermined format; and means for causing the computer to transmit the generated formatted document data through the network.

12. An article of manufacture comprising a computer usable medium having computer readable program code means embodied therein for causing speech data to be converted into formatted document data in a speech control apparatus to which a plurality of terminal units are connected through a network, the computer readable program code means comprising:

means for causing a computer to receive speech data and data identifying a format type transmitted from each of the terminal units;

means for causing the computer to recognize the received speech data, convert the recognized speech data into document data, and generate document data having a format corresponding to the format type for each terminal unit; and means for causing the computer to transmit the generated formatted document data to a specified terminal unit through the network.

* * * * *

(12) EX PARTE REEXAMINATION CERTIFICATE (8163rd)
United States Patent
Yamakita

(10) Number: US 5,956,681 C1
(45) Certificate Issued: Apr. 19, 2011

(54) APPARATUS FOR GENERATING TEXT DATA ON THE BASIS OF SPEECH DATA INPUT FROM TERMINAL

(75) Inventor: Tooru Yamakita, Fussa (JP)

(73) Assignee: Intellectual Ventures Holding 56 LLC, Carson City, NV (US)

Reexamination Request:
No. 90/011,282, Oct. 13, 2010

Reexamination Certificate for:
Patent No.: 5,956,681
Issued: Sep. 21, 1999
Appl. No.: 08/966,912
Filed: Nov. 6, 1997

(51) Int. Cl.
*G10L 13/08* (2006.01)

(52) U.S. Cl. ........................................ 704/260; 704/231
(58) Field of Classification Search ..................... None
See application file for complete search history.

(56) References Cited

U.S. PATENT DOCUMENTS

| | | | |
|---|---|---|---|
| 5,546,538 A | 8/1996 | Cobbley et al. |
| 5,870,454 A | 2/1999 | Dahlen |
| 5,956,681 A | 9/1999 | Yamakita |
| 6,125,347 A | 9/2000 | Cote et al. |

FOREIGN PATENT DOCUMENTS

JP 07222248 A 8/1995

OTHER PUBLICATIONS

Nick Haddock, "Structuring Voice Records Using Keywork Labels", 1996 ACMI Conference, Apr. 13–18, 1996, 3 pages.

*Primary Examiner*—M. Steelman

(57) ABSTRACT

A speech signal input from the microphone of a mobile terminal having a PHS function in a communication or off-line state is sent from a PHS network to a speech control host unit connected to a LAN in a specific speech service provider through the Internet and recognized. The contents of the recognition result are automatically determined and shaped into text data of a format type designated from the mobile terminal, and more particularly, into E-mail text data or FAX text data. The formatted text data is returned to the mobile terminal in real time and edited on the mobile terminal as needed. Thereafter, the E-mail text data or FAX text data is transferred to the speech control host unit and transmitted. In this system, the mobile terminal does not require any advanced speech recognition environment and can have a speech recognition function having a practical accuracy at a low cost. The mobile terminal can also be equipped with an E-mail/FAX generation/transmission function based on the speech recognition result.

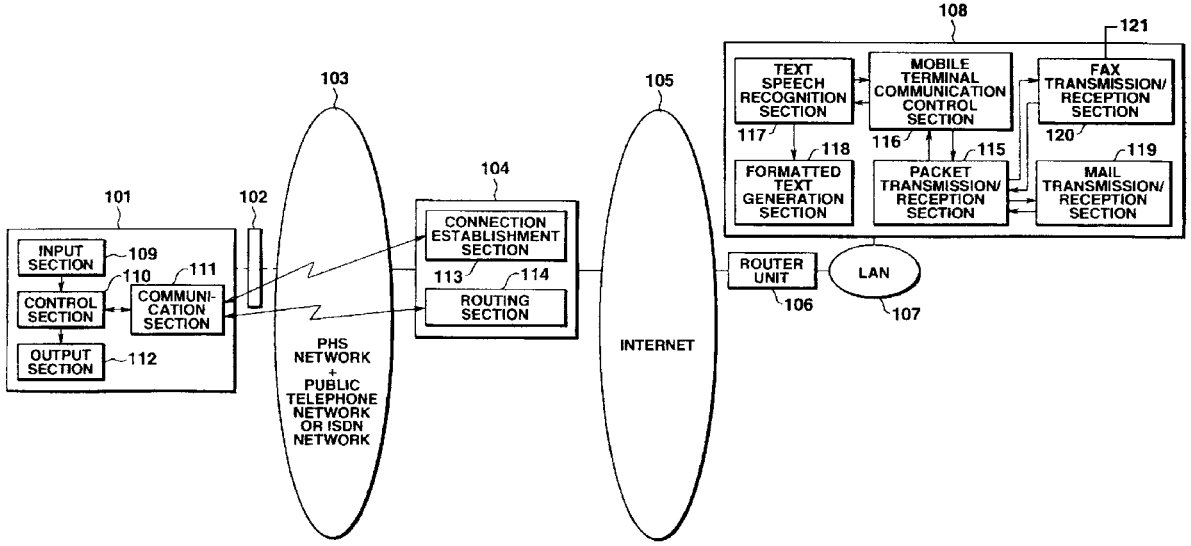

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-12 is confirmed.

* * * * *